United States Patent [19]

Shustorovich et al.

[11] Patent Number: 6,028,956
[45] Date of Patent: *Feb. 22, 2000

[54] OBJECT LOCATION AND SPAN DETERMINATION METHOD AND APPARATUS WHICH DETERMINES A LOCATION AND SPAN OF AN OBJECT IN AN IMAGE

[75] Inventors: Alexander Shustorovich; Christopher W. Thrasher, both of Rochester, N.Y.

[73] Assignee: Kofile Inc., Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,372

[22] Filed: Apr. 4, 1997

[51] Int. Cl.[7] .................................................. G06K 9/62

[52] U.S. Cl. .................... 382/156; 382/159; 382/173; 382/186; 706/20; 706/31

[58] Field of Search ..................................... 382/155, 156, 382/158, 159, 161, 102, 173, 178, 181–188, 224–228, 190–195; 706/20, 179–180, 10, 15–16, 25, 31, 42, 43

[56] References Cited

U.S. PATENT DOCUMENTS

| | | |
|---|---|---|
| 4,933,977 | 6/1990 | Ohnishi et al. . |
| 5,052,043 | 9/1991 | Garborski ................................. 382/157 |
| 5,105,468 | 4/1992 | Guyon et al. . |
| 5,119,438 | 6/1992 | Ueda et al. . |
| 5,131,073 | 7/1992 | Furuta et al. . |
| 5,151,951 | 9/1992 | Ueda et al. . |
| 5,239,593 | 8/1993 | Wittner et al. . |
| 5,245,672 | 9/1993 | Wilson et al. . |
| 5,299,269 | 3/1994 | Gaborski et al. . |
| 5,337,370 | 8/1994 | Gilles et al. ............................. 382/102 |
| 5,440,651 | 8/1995 | Martin .................................... 382/156 |
| 5,500,905 | 3/1996 | Martin et al. ........................... 382/157 |
| 5,542,006 | 7/1996 | Shustorovich et al. . |

OTHER PUBLICATIONS

John G. Daugman, "Complete Discrete 2–D Gabor Transforms by Neural Networks for Image Analysis and Compression", *IEEE Transactions on Acoustics, Speech and Signal Processing,* vol. 36, No. 7, pp. 1169–1179, (Jul. 1980).

Yoshua Bengio, Yann Le Cun, Donnie Henderson, "Globally Trained Handwritten Word Recognizer Using Spatial Representation, Convolutional Neural Networks and Hidden Markov Models" *Proceedings of 1993 Conference on Neural Information Processing Systems—Natural and Synthetic,* Nov. 29–Dec. 2, 1993, Denver, Colorado, pp. 937–944.

Amar Gupta, M.V. Nagendraprasad, A. Liu, P.S.P. Wang and S. Ayyadurai, "An Integrated Architecture for Recognition of Totally Unconstrained Handwritten Numerals", *International Journal of Pattern Recognition and Artificial Intelligence,* vol. 7, No. 4, pp. 757–773, copyright World Scientific Publishing Company, (1993).

Gale Martin, Mosfeq Rashid, David Chapman and James Pittman, "Learning to See Where and What: Training a Net to Make Saccades and Recognize Handwritten Characters", appears in S.J. Hanson et al (eds.), *Advances in Neural Information Processing Systems,* vol. 5, pp. 441–447, (Morgan Kaufmann Publisher, San Mateo California), (1993).

Alexander Shustorovich and Christopher W. Thrasher, "Neural Network Positioning and Classification of Handwritten Characters", *Neural Networks,* vol. 9, No. 4, pp. 685–693, copyright Elsevier Science Ltd. (1996).

(List continued on next page.)

*Primary Examiner*—Leo H. Boudreau
*Assistant Examiner*—Ishrat Sherali
*Attorney, Agent, or Firm*—Gardere & Wynne, LLP; Sanford E. Warren, Jr.; Daniel J. Chalker

[57] ABSTRACT

Apparatus and method for determining a location and span of an object in an image. The determined location and span of the object are used to process the image to simplify a subsequent classification process.

24 Claims, 16 Drawing Sheets

OTHER PUBLICATIONS

James A. Freeman and David M. Skapura, *Neural Networks; Algorithms, Applications, and Programming Techniques,* pp. 89–125, copyright Addison–Welsey Publishing Company, Inc., (1991).

Daid E. Rumelhart, James L. McClelland and the PDP Research Group, *Parellel Distributed Processing: Explorations in the Microstructure of Cognition, vol. 1: Foundations,* pp. 328–330, copyright MIT Press (1986).

Jim Keeler and David E. Rumelhart, "A Self–Organizing Integrated Segmentation and Recognition Neural Net", appears in J.E. Moody et al (eds.), *Advances in Neural Information Processing Systems,* vol. 4, pp. 496–503, (Morgan Kaufmann Publishers, San Mateo, California), (1992).

Alexander Shustorovich, "A Subspace Projection Approach to Feature Extraction: The Two–Dimensional Gabor Transform for Character Recognition", *Neural Networks,* vol. 7, No. 8, pp. 1295–1301, (1994).

OBJECT LOCATION AND SPAN DETERMINATION METHOD AND APPARATUS WHICH DETERMINES A LOCATION AND SPAN OF AN OBJECT IN AN IMAGE

BACKGROUND OF THE INVENTION a. Field of the Invention

The present invention concerns an apparatus, and an accompanying method, for locating positions, such as centers, and spans of all desired objects within an input field. The desired objects can then be preprocessed based on their locations and spans before subsequent classification to optimize such classification process.

b. Related Art

Optical character recognition (or "OCR") systems should be able to accurately automate the process of recognizing and translating first machine printed alphanumeric characters, and ultimately handwritten characters, into appropriate digital data. For various reasons not relevant here, starting several years ago and continuing to the present, neural networks are seen in the art as a preferred technique for providing accurate character recognition in an OCR system. Although neural networks are known to those skilled in the art, they will be briefly described below for the reader's convenience.

In contrast to traditional sequential "Von Neumann" digital processors that operate with mathematical precision, neural networks are generally analog—though digital implementations are increasingly common, and typically manifest massively parallel processing. These networks provide fast and often surprisingly good output approximations, but not precise results, b)y making weighted decisions on the basis of fuzzy, incomplete and/or frequently contradictory input data.

By way of background, a neural network is basically a configuration of identical processing elements, so-called neurons, arranged in a multi-layered hierarchical configuration. Each neuron can have one or more inputs, but only one output. Each input is weighted by a coefficient. The output of a neuron is typically calculated as a function of the sum of its weighted inputs and a bias value. This function, the so-called activation function, is typically a "sigmoid" function; i.e. it is S-shaped, monotonically increases and asymptotically approaches fixed values typically +1, and zero or −1 as its input respectively approaches positive or negative infinity. The sigmoid function and the individual neural weight and bias values determine the response or "excitability" of the neuron to signals presented to its inputs.

The output of a neuron in one layer may be distributed as input to neurons in a higher layer. A typical neural network contains at least three distinct layers: (i) an input layer situated at the bottom of the network; (ii) an output layer situated at the top of the network; and (iii) one or more hierarchical interconnected hidden layers located intermediately between the input and output layers.

For example, if a neural network were to be used for recognizing normalized alphanumeric characters situated within a 7×5 pixel array, then the output of a sensor for each pixel in that array, such as a cell of an appropriate charge coupled device (CCD), would be routed as input to a different neuron in the input layer. Thirty-five different neurons, one for each different pixel, would exist in this input layer. Each neuron in this input layer would have only one input. The outputs of all 35 neurons in the input layer would be distributed, in turn, as input to every neuron in, e.g., a single intermediate or so-called hidden layer.

The number of neurons in this single hidden layer, as well as the number of separate hidden layers that is used in the neural network, depends, inter alia, upon the complexity of the character bit-maps to be presented to the network for recognition; the desired information capacity of the network; the degree to which the network, once trained, can handle unfamiliar patterns; and the number of iterations that the network must undergo during training for all the network weight and bias values to properly converge.

If the network were to utilize several separate hidden layers, then the output from each neuron in the first (i.e. lowest) hidden layer would feed the inputs to the neurons in the second (i.e. next higher) hidden layer and so forth for the remaining hidden layers. The output of the neurons in the last (i.e. highest) hidden layer would feed the neural inputs in the output layer. The output of the network typically feeds a processor or other circuitry that converts the network output into appropriate multi-bit digital data, e.g. ASCII characters, for subsequent processing.

Generally, the output of each of the neurons in the last hidden layer is distributed as an input to every neuron in the output layer. The number of neurons in the output layer typically equals the number of different characters that the network is to recognize (or classify), with the output of each such neuron corresponding to a different one of these characters. The numerical outputs from all the output layer neurons form the output of the neural network. For example, one output neuron may be associated with the letter "A", another with the letter "B", a third with the letter "a", a fourth with the letter "b" and so on for each different alphanumeric character, including letters, numbers, punctuation marks and/or other desired symbols, if any, that is to be recognized by the network.

The use of a neural network generally involves two distinct successive procedures: (i) initialization and training of the neural network using known pre-defined patterns having known outputs; and (ii) recognition (or classification) of actual unknown patterns by the trained neural network. Although those skilled in the art know how to initialize and train neural networks, such initialization and training is briefly discussed below for the reader's convenience.

To initialize the network, the weights and biases of all the neurons situated therein are set to random values typically within certain fixed bounds. Thereafter, the network is trained. Specifically, the neural network is successively presented with pre-defined input data patterns, i.e. so-called training patterns. The values of the neural weights and biases in the neural network are simultaneously adjusted such that the output of the neural network for each individual training pattern approximately matches a desired corresponding neural network output (target vector) for that pattern. Once training is complete, all the weights and biases are then fixed at their current values.

One technique commonly used in the art for adjusting the values of the weights and biases of all the neurons during training is back error propagation (hereinafter referred to simply as "back propagation"). Briefly, this technique involves presenting a pre-defined input training pattern (input vector) to the neural network and allowing that pattern to be propagated forward through the neural network to produce a corresponding output pattern (output vector, O) at the output neurons. The error associated with the output pattern is determined and then back propagated through the neural network to apportion this error to individual neurons in the network. Thereafter, the weights and bias for each neuron are adjusted in a direction and by an amount that minimizes the total network error for this input pattern.

Once all the network weights have been adjusted for one training pattern, the next training pattern is presented to the network and the error determination and weight adjusting process iteratively repeats, and so on for each successive training pattern. Typically, once the total network error for each of these patterns reaches a pre-defined limit, these iterations stop and training halts. At this point, all the network weight and bias values are fixed at their then current values. Thereafter, character recognition on unknown input data can occur at a relatively high speed.

Once the neural network has been trained, it can be used to recognize unknown patterns. During pattern recognition, each unknown pattern is applied to the inputs of the neural network and resulting corresponding neural network responses are taken from the output nodes. Ideally speaking, once the neural network recognizes an unknown input pattern to be a given character on which the neural network was trained, then the signal produced by a neuron in the output layer and associated with that character should sharply increase relative to the signals produced by all the other neurons in the output layer.

During character recognition, a "winner take all" approach is generally used to identify the specific character that has been recognized by the network. Under this approach, once the neural network has fully reacted to an input data pattern, then the one output neuron that generates the highest output value relative to those produced by the other output neurons is selected, typically by a processing circuit connected to the neural network, as the network output. Having made this selection, the processor then determines, such as through a simple table look-up operation, the multi-bit digital representation of the specific character identified by the neural network.

Neural network based OCR systems have exhibited excellent performance characteristics with machine printed text, particularly "clean" text that exhibits a high degree of uniformity, in terms of line thickness and orientation, from one character to the next. Unfortunately, the task of recognizing characters, even through the use of a neural network, is complicated by the existence of touching or otherwise overlapping characters. While a very small number of machine printed characters actually touch, due to kerning and the like, touching and overlapping characters are particularly prevalent with handwritten text and numerals, effectively exhibiting, due to human variability, an infinite number of variations. As a practical matter, neural networks are not trained to recognize even a major portion, let alone all, of these variations; some preprocessing is needed to simplify the recognition task of a neural network.

In an effort to greatly simplify the task of recognizing human handwriting, the art teaches the use of determining those characters which touch and then segmenting or otherwise partitioning these characters and recognizing each character that results. In this regard, the art teaches two basic approaches: (i) performing segmentation before character recognition; or (ii) simultaneously performing both segmentation and recognition.

One example of the pre-recognition segmentation approach is the system disclosed in U.S. Pat. No. 5,299,269 (issued to R. S. Gaborski et al on Mar. 29, 1994 and assigned to the present assignee hereof, also referred to herein as "the '269 patent"). In the system disclosed in the '269 patent, a window is stepped across an image field, on a pixel-by-pixel basis, to capture a sub-image, i.e. a kernel of the image at each step. An associated memory or neural network is trained., through one training set, to recognize all non-character images that can exist within the sub-image, i.e. all possible intersections and combinations of known characters that correspond to window positions that straddle adjacent characters. This training includes window-captured sub-images that in the past were incorrectly perceived as being centered on a character when, in fact, they were not, i.e. the result of false character segmentation.

The same memory or network, or a second one, is trained, through a second training set, to recognize the individual "non-straddling" characters of a given character set. If one item of the training sets is recognized, then the entire sub-image is forwarded to a downstream portion of an OCR system for further character recognition.

For the system disclosed in the '269 patent to properly function, the appropriate memory or network must be trained on all possible non-character images. Unfortunately, a very large, potentially infinite, number of such images can exist. Since a training sequence cannot encompass all such non-character images, the accuracy with which any one of these images will be recognized will be reduced as the number of non-character training images is decreased. Furthermore, as the number of different characters which a network (or memory) must recognize increases, the size and complexity of that network (or memory) increases at a considerably greater rate. Hence, the system disclosed in the '269 patent may be impractical in many applications.

Another example of the pre-recognition segmentation approach is described in A. Gupta et al, "An Integrated Architecture for Recognition of Totally Unconstrained Handwritten Numerals", *International Journal of Pattern Recognition and Artificial Intelligence*, Vol. 7, No. 4, pages 757–773 (1993) (hereinafter referred to as "the Gupta article"). In the system discussed in the Gupta article, once an image is scanned, typically to implement machine recognition of a handwritten zip code, a resulting digital binary bit-map of a source document, such as an envelope, is passed through a preprocessing stage which performs segmentation, thinning and rethickening (the latter two functions to impart uniform thickness to otherwise differing stroke thicknesses among different characters) as well as character size normalization and slant correction. Character recognition is then performed on a resulting preprocessed bit-map. By reducing differences among resulting characters, the complexity of the recognition stage, particularly the neural network used therein, would be considerably reduced. However, the pre-recognition segmentation approach has exhibited, on an empirical basis, quite some difficulty in accurately separating touching characters.

Consequently, as a result of this difficulty among other reasons, the art is turning to a combined (concurrent) segmentation-recognition approach. This latter approach typically involves moving a window, e.g. a so-called "sliding" window, of a certain width across a field and fabricating confidence measures for competing character classifications to determine if the window is positioned directly on top of character and to try to recognize a character within the window. A combined segmentation/recognition approach is described, for example, in Martin et al, "Learning to See Where and What: Training a Net to Make Saccades and Recognize Handwritten Characters" (1993), appears in S. J. Hanson et al (eds.), *Advances in Neural Information Processing Systems*, Volume 5, pages 441–447 (Morgan Kaufmann Publishers, San Mateo, Calif.) (hereinafter referred to as "the Martin article"). In the system discussed in the Martin article (which, for convenience, will henceforth be referred to herein as the "Saccade" system) a four-layer neural network (i.e. with two hidden layers) is trained, using back propagation, not only to locate and recognize characters, by class, in the center of a window (as well as whether a character exists in the window or not) but also to make corrective jumps, i.e. so-called "saccades", to the nearest character, and after its recognition, to the next character and so forth. Unfortunately, this system tends to miss (jump over) relatively narrow characters and occasionally duplicates relatively wide characters, thereby reducing overall recognition accuracy.

Another combined segmentation/recognition approach, is described in Bengio et al, "Globally Trained Handwritten Word Recognizer using Spatial Representation, Convolutional Neural Networks and Hidden Markov Models", *Proceedings of* 1993 *Conference on Neural Information Processing Systems—Natural and Synthetic*, Nov. 29–Dec. 2, 1993, Denver, Colo., pages 937–944 (hereinafter referred to as "the Bengio article"). The approach discussed in the Benjio article uses a multi-layer convolution neural network with multiple, spatially replicated, sliding windows displaced by a one or several pixel shift with respect to each other along the scanning direction. The outputs of corresponding neural classifiers serve as input to a post-processing module, specifically a hidden Markov model, to decide which one of the windows is centrally located over a character. This approach provides a neural output indicating whether the character is centered within a window or not. Unfortunately, this particular approach of replicating a neural classifier, when viewed with the need for post-processing, tends to be quite expensive computationally and relatively slow, and thus impractical.

Therefore, a general and still unsatisfied need exists in the art for an OCR system that can accurately and efficiently recognize handwritten characters that include touching and/ or otherwise overlapping characters. Moreover, the system should be able to normalize characters within an input field. Furthermore, the system should also be able to operate in more generalized applications such that it can find and classify objects within an image.

In furtherance of meeting this general need, we believe that a relatively simple and fast, yet accurate apparatus (and an accompanying method), particularly suited for inclusion within an object location and classification (or recognition) system (e.g., an OCR system) should properly locate each object (or character) that is to be recognized from within an image field. To handle a wide variety of different objects, the apparatus will preferably utilize a neural network. By using such a method apparatus in conjunction with appropriate object classification (or recognition) means, by centrally positioning a recognition window over the object and by determining a span of the object, fewer different patterns within the window would need to be classified, thereby simplifying and/or increasing the accuracy of the classification (or recognition) task. Hence, the resulting system would likely recognize objects (e.g., handwritten characters) more accurately and efficiently than has heretofore occurred with OCR systems known in the art.

SUMMARY OF THE INVENTION

The present invention satisfies the above mentioned need by providing a method for processing an image containing an object to be subsequently classified. The method includes steps of: (a) generating windows; (b) applying the generated windows to the image to form windowed images; (c) determining a position of the object based on the windowed images; (d) determining a span of the object based on the windowed images; (e) normalizing the object based on the determined span to form a normalized object; and (f) centering the normalized object within a classification window based on the determined position. A subsequent classification of the object may then be performed on the classification window. The position of the object determined is preferably (a horizontal coordinate corresponding to) a center or "heart" of the object.

The step of generating windows preferably includes sub-steps of: (i) determining a first horizontal position at a first horizontal side of the image; (ii) applying a window having a predetermined size at the first horizontal position of the image; (iii) determining a next horizontal position; (iv) applying a window having the predetermined size at the next horizontal position; and (v) repeating the sub-steps of determining a next horizontal position and applying a window. Thus, the window is (or a series of windows are) "stepped" across the image. The image is preferably defined by a two-dimensional array of pixels. In this case, the sub-step of determining a next horizontal position includes a step of moving the window a predetermined number of pixels in a first horizontal direction (e.g., to the right) away from the first horizontal ;side (e.g., left side) of the image.

The steps of determining a position of the object based on the windowed images, and determining a span of the object: based on the windowed images, collectively, preferably include a sub-step of providing the windowed images to a learning mechanism trained to determine the position and span of an object. In particular, these steps, collectively, preferably include sub-steps of: (i) providing the windowed images to a learning mechanism trained to determine the position and span of an object; and (ii) post-processing outputs of the learning mechanism.

The sub-step of post-processing outputs of the learning mechanism preferably includes steps of: (i) filtering the outputs of the learning mechanism to generate filtered outputs; (ii) thresholding the filtered outputs to generate thresholded, filtered outputs; (iii) determining the position the object based on a center of mass of the thresholded, filtered outputs; and (iv: determining the span of the object based on the thresholded, filtered outputs.

The method of the present invention may include preprocessing steps of: (i) detecting sub-images within the image; (ii) normalizing the detected sub-images; and (iii) reassembling the normalized detected sub-images.

If a one-dimensional position (e.g., vertical position) of the object to be classified within the image is not known in advance, the present invention preferably iteratively applies finer resolution sub-images of the image, as the input image, until the position of the object can be determined.

The present invention also provides a method for classifying an object contained in an image. This method includes steps of: (a) generating windows; (b) applying the generated windows to the image to form windowed images; (c) determining a position of the object based on the windowed images; (d) determining a span of the object based on the windowed images; (e) normalizing the object based on the determined span to form a normalized object; (f) centering the normalized object within a classification window based on the determined position; and (g) classifying the object based on the classification window to generate a classification result. This method may include a further step of postprocessing the classification result based on (i) a confidence measure, and/or (ii) the determined position of the object. The determined position of the object is preferably a horizontal coordinate corresponding to the center or "heart" of the object.

The method may include preprocessing steps of: (a) detecting sub-images within the image; (b) normalizing the detected sub-images; and (c) reassembling the normalized detected sub-images. In this case, the classification result is further processed based on (i) a confidence measure, (ii) the determined position of the object, and/or (iii) a sub-image boundary.

The present invention also provides a device for processing an image having an object to be classified. The device includes: (a) means for generating windows and for applying the generated windows to the image to form windowed images; (b) means for determining a position and a span of the object based on the windowed images; (c) means for normalizing the object based on the determined span to form a normalized object; and (d) means for centering the normalized object within a classification window based on the determined position. The normalized object centered within the classification window may then be classified. The position of the object may be (a horizontal coordinate corresponding to) the center or "heart" of the object.

The means for determining a position and a span of the object is preferably a trained learning mechanism. The trained learning mechanism may be a neural network. Such a neural network may include an input layer of neurons, a Gabor layer of neurons having inputs coupled with outputs of the neurons of the input layer, at least one hidden layer (and preferably three (3) hidden layers) of neurons, and an output layer of neurons.

The means for determining a position and a span of the object based on the windowed images may include: (i) a trained learning mechanism providing outputs based on the windowed images; and (ii) means for post-processing the outputs of the trained learning mechanism. The means for post-processing may include: (i) means filtering the outputs of the learning mechanism to generate filtered outputs; (ii) means for thresholding the filtered outputs to generate thresholded, filtered outputs; (iii) means for determining the position the object based on a center of mass of the thresholded, filtered outputs; and (iv) means for determining the span of the object based on the thresholded, filtered outputs.

The device of the present invention may include preprocessing means including: (i) means for detecting sub-images within the image; (ii) means for normalizing the detected sub-images; and (iii) means for reassembling the normalized detected sub-images.

The device of the present invention may further include means for classifying the object based on the classification window to generate a classification result. The device of the present invention may furthermore include means for post-processing the classification result based on (i) a confidence measure, (ii) the determined position of the object, and/or (iii) a sub-image boundary.

BRIEF DESCRIPTION OF THE DRAWINGS

To facilitate understanding, identical reference numerals have been used, where appropriate, to denote either identical or similar elements that are common to various figures.

DETAILED DESCRIPTION

The present invention concerns a novel object location and span determination method and apparatus. The apparatus and method may be used in an object classification system. The following description is presented to enable one skilled in the art to make and use the invention, and is provided in the context of a particular application and its requirements. Various modifications to the preferred embodiment will be apparent to those skilled in the art and the general principles set forth below may be applied to other embodiments and applications. Thus, the present invention is not intended to be limited to the embodiment shown.

For example, after reading the following description, those skilled in the art will readily appreciate that our inventive neural network based object position and span detector, while ideally suited for use in an optical character recognition (OCR) system, can be used in a wide variety of other pattern recognition applications to accurately locate an object within an image, and certainly within a scanned portion of that image. For example, one such illustrative application in so-called "machine vision" might include sliding a scanning window across an image to first coarsely locate or at least determine the existence of certain desired objects, such as pre-defined shapes, within an image or portion thereof. Once such an object is determined to exist, our invention can be used to precisely locate the object within a classification input window. The windowed portion of the image would then be scanned at fine resolution, and subsequently processed, using an appropriate classification process, to recognize and otherwise identify the object at high accuracy.

Our invention permits the heart and span of an object to be precisely located before a classification process, and, through doing so, simplifies subsequent classification and also improves overall classification accuracy. However, since our invention is particularly well suited for use within an OCR system to accurately locate characters for subsequent recognition, our invention will be discussed in that context.

Figure 1:
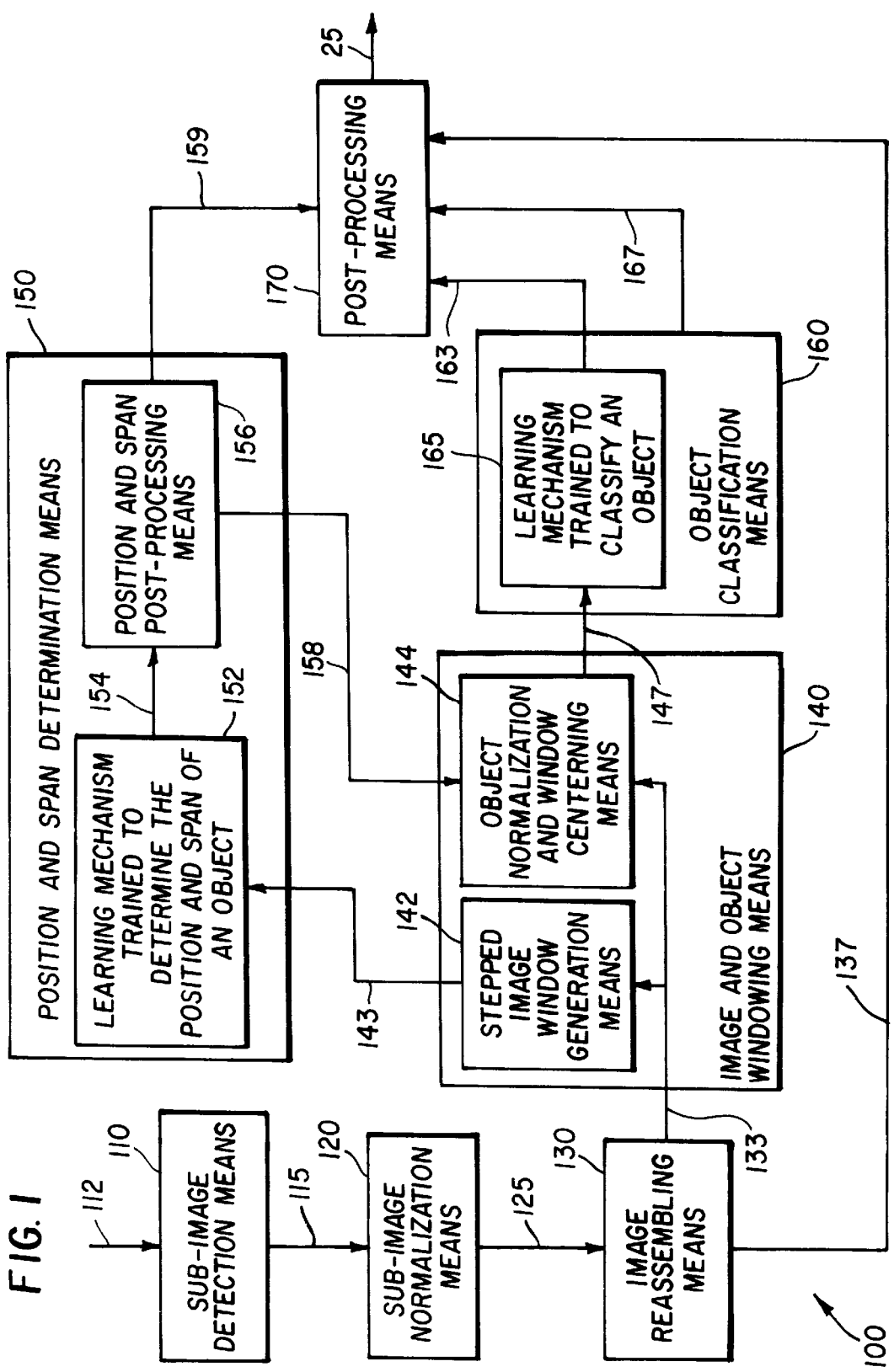
FIG. 1 is a high level block diagram of an embodiment of an object classification (or recognition) system constructed in accordance with the teachings of the present invention.

FIG. 1 is a block diagram of an embodiment of an object recognition system 100 constructed in accordance with the teachings of the present invention. Broadly speaking, this system 100 parses an incoming image 112 into appropriate scaled sub-images 125, with each sub-image containing one or more objects, locates the center ("heart") and determines the span of the one or more objects within the sub-image through use of a sliding window and a learning mechanism trained to determine the position(s) and span(s) of the object(s) 152, normalizes each object based on its span, centers a classification window over the object based on its position, routes the classification windows of the sub-image to an object classification means 160, and produces an output label string containing the classified objects.

Advantageously, our inventive learning mechanism trained to determine the-position(s) and span(s) of object(s) (e.g., a trained neural network) 152 produces an array of outputs which collectively (i) locates the center of each object, at a given horizontal pixel position of the sliding window, and (ii) determines an average vertical span (as a number of pixels) of the object. The object heart location is determined with increased accuracy than which occurs through systems, as heretofore taught in the art, that provide a single centered/not centered indicia.

More specifically, the object recognition system 100 contains sub-image detection means 110, sub-image normalization means 120, image reassembling means 130, image and object windowing means 140, position and span determination means 150, object classification means 160, and post-processing means 170. The position and span determination means 150 includes a learning mechanism trained to determine the position(s) and span(s) of object(s) 152 (e.g., a trained neural network, nearest neighbor classifier, Beizien statistics mechanism, etc.), and position and span postprocessing means 156. The object classification means 160 includes a learning mechanism trained to classify an object (e.g., a neural network) 165. The image and object windowing means 140 includes stepped image window generation means 142 and object normalization and window centering means 144.

Figure 11:
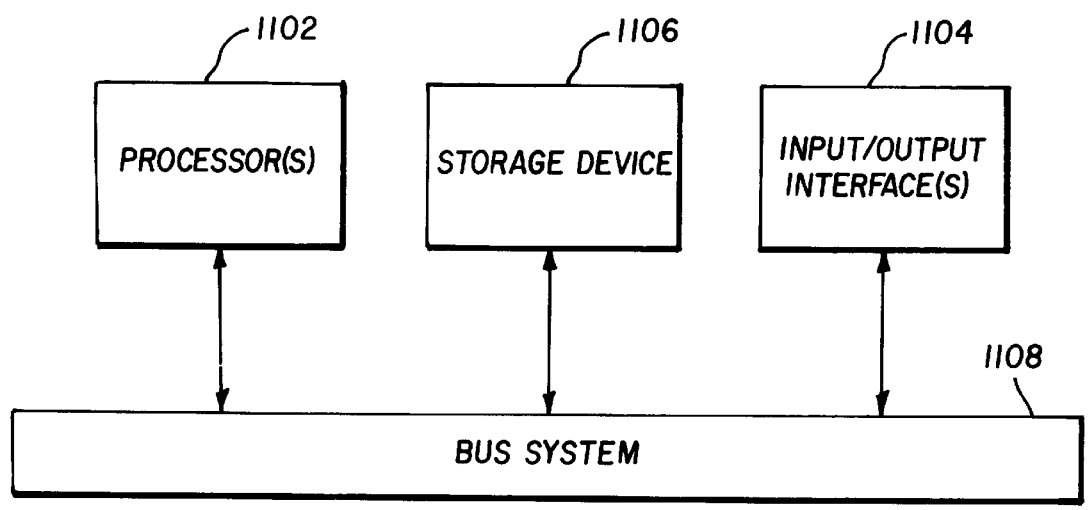
FIG. 11 is a high level block diagram of an embodiment of the system of the present invention.

The means of the system 100 may be collectively implemented as machine instructions executing on one or more processors. Further, as shown in FIG. 11, the system 100 can be implemented on a system having a processor(s) 1102, an input/output interface(s) 1104, a storage device 1106 which may store, inter alia, a sequence of instructions to be executed by the processor(s) 1102, and a shared bus 1108.

To facilitate understanding, throughout the following discussion of FIG. 1, the reader should also refer to FIGS. 3a–3d, the latter figures diagrammatically depicting sequences of high-level operations performed by object recognition system 100, shown in FIG. 1, on illustrative input fields 310 of handwritten characters.

In operation, an incoming image (e.g., a scanned, digitized pixel image) 112, which contains one or more objects (e.g., handwritten characters) to be recognized, is divided (by means not shown) into horizontal rows (e.g., 24 pixels high and 150 pixels wide), hereinafter referred to as "fields". Each field, such as field 310 (not drawn to scale) is expected to contain at least one object. The size and center location of each such object within the field 310 often varies widely among the objects. For example, if the objects are characters, the variability of a person's handwriting can cause the size and center location of each character to vary among characters.

Field 310a illustratively contains five characters. To simplify the ensuing center position determination, span determination, and character recognition tasks, the incoming pixels in each field 310a are first preprocessed. In doing so within the object recognition system 100, these pixels are first applied, via path 112, to sub-image detection means 110. The sub-image detection means 110 locates non-object columns that are sufficiently wide, typically 4–6 pixels, to serve as sub-image boundaries between adjacent objects in the field 310a. For example, if the objects are characters, the sub-image detection means 110 locates blank columns to serve as boundaries between adjacent characters. Each resulting sub-image in FIG. 3a, such as boxed sub-images 322 and 324, may contain a separate object.

To reduce the number of separate training patterns that need to be applied to the two neural networks, as discussed below, that are separately used in object position and span determination and object recognition, and thus significantly simplify these neural networks, all sub-images, appearing on path 115, are then normalized to a common size (e.g., 20 pixels in height) by sub-image normalization means 120. Unfortunately, however, at this point, if a sub-image (e.g., 322) contains more than one object, the objects within the sub-image are normalized as a group, an not individually. However, our invention overcomes this problem as will become apparent in the following description. The resulting normalized sub-images are applied, via path 125, to image reassembling means 130. The image reassembling means reassembles the normalized sub-images, in the exact sequence detected, back into a single field, such as field 330a, having a height of 20 pixels. To simplify the following discussion, from hereon, a "field" will be that produced by image reassembling means 130, unless specifically noted to the contrary. The image reassembling means 130 also provides sub-image boundary address information, via path 137, to postprocessing means 170. Although, as will become evident based on the discussion below, this step is not necessary, providing this sub-image boundary address Information expedites postprocessing.

Blank columns (e.g., 12 pixels wide) may be prepended and appended to each field 330 so that first and last objects therein are not missed. Using the image reassembling means 130, sub-images (e.g., 322 and 324) are assembled, as sub-fields, with as little as a four to six pixel gap between adjacent sub-fields, into a common field, thereby eliminating any further need to manipulate and process much larger sub-images. Two blank lines are added both along the top and bottom of the recombined field as preferred by the so-called "Gabor projection" technique; this technique is described in A. Shustorovich, "A Subspace Projection Approach to Feature Extraction: The Two-Dimensional Gabor Transform for Character Recognition", *Neural Networks*, 1994, Vol. 7, No. 8, pp. 1295–1301 (which is incorporated herein by reference).

Sub-image detection means 110, sub-image normalization means 120 and image reassembling means 130 are all conventional and well known in the art. For optimum performance, each of these means is preferably implemented through high-speed dedicated programmable digital hardware rather than a programmed general purpose microcomputer.

Sub-field boundary address information is also provided, via path 133, to image and object windowing means 140. Though not specifically shown and not relevant to the present invention, the binary pixels in the sub-images may also be preprocessed in a known manner to exhibit a simulated gray scale.

Using the sub-field boundary address information, stepped image window generation means 142 of the image windowing means 140 crops (parses) a sequence of 24-pixel high by 48-pixel wide portions (hereinafter referred to as a "windows") from an accepted field. Each window has a specific horizontal offset (step size) with respect to the next window. The windowed image portions are passed, via path 143, to position and span determination means 150, and more specifically, to a learning mechanism trained to determine the position and span determining of an object 152 (e.g., a trained neural network) therein. Consequently, a sequence of positionally staggered, overlapping 48-pixel wide windows that collectively traverse across the entire field 330 (i.e., a so-called "sliding" or "stepped" window) results. Each of these windows, as will be shortly become evident, is essentially and separately convolved with the field portion.

The learning mechanism trained to determine the position and span of an object may be a neural network 152', specifically depicted in FIG. 2a and discussed in detail below, which provides 240 separate neural network activation outputs. The neural network activation outputs collectively signal (i) whether an object in the field is centered, i.e. has its "heart", coincident with any 1-pixel wide column within a 24-pixel high by 12-pixel wide array located within the center of each 24-pixel high by 48-pixel wide window, as that window is then positioned relative to the field 330, and (ii) an average vertical span of the object. Each of the neural activations corresponds to one of 240 horizontal and vertical pixel positions along this array. The precision at which a human operator can mark a character "heart" and the span of a character heart is relatively low, typically within a resolution of one or two pixels at best. As such, the position and span determining neural network 152 is trained to produce target high level, i.e. one, output activations at three consecutive horizontal output nodes (output neurons) if the object "heart" exists at a pixel position corresponding to that associated with the middle of these three nodes and if the output activation corresponds to the average vertical span of the object. The rest of the neural activation outputs are set to low, i.e. zero. In this manner, a two dimensional output waveform corresponding to the 240 output neurons exhibits "swells" of a finite length or "clouds" of activation that indicate each object "heart" (e.g., the "height of the swell") and the span of each object heart (e.g., the "length of the swell") as the sliding window effectively passes over it. To permit all or most of the objects centered at each of the twelve (12) output node pixel positions to fit inside the window, two (2) 18-pixel wide column buffer positions (See e.g., 440 and 450 of FIG. 4.), on both the far left and right sides of the window, though without corresponding output nodes, are provided within the position and span determining neural network 152.

The activation outputs (e.g., 240) associated with each window, provided by position and span determining neural network 152, are routed, via path 154, to position and span postprocessing means 156. This means accumulates the activation outputs for the same pixel position in the field, but corresponding to different windows (i.e., different window positions within the field), and then averages, typically on a weighted basis, these activation outputs. This averaging imparts a required level of robustness into the detected object "heart" position and span. By virtue of averaging, a speed-robustness tradeoff exists. For example, assuming a twelve-pixel wide window, for a one-pixel step size, twelve (12) output activations must be averaged; for a two-pixel step size, six (6) output activations must be averaged; for a three-pixel step size, four (4) output activations must be averaged; for a four-pixel step size, three (3) output activations must be averaged, for a six-pixel step size, two (2) output activations must be averaged; etc. More specifically, a small sliding step size, such as one or two pixels, can be chosen to produce increased position, span and character recognition accuracies but at a cost of additional processing time and hence reduced character recognition throughout. We have found that a step size of four or six pixels, as illustratively used below, provides excellent performance in terms of throughput and recognition accuracy of handwritten characters.

In addition to performing activation output accumulation and averaging, position and span postprocessing means 156 may also filter (or smooth) the averages (e.g., using a 3×3 pixel window) and generate an object-heart index, $\chi$. Then, position and span postprocessing means 156 thresholds a thus-obtained three-dimensional $\chi$-wave and thereafter, based on another weighted average of individual $\chi$-values weighted by corresponding horizontal and vertical pixel positions, determines the horizontal pixel position of the object "heart" and the vertical span of the object.

The processing carried out by the position and span postprocessing means 156 on the two-dimensional output activation array is analogous to that described in U.S. Pat. No. 5,542,000 (incorporated herein by reference) and carried out on a two-dimensional output activation wave.

The position and span postprocessing means 156, shown in FIG. 1, provides control signals corresponding to object hearts and object spans, via path 158, to image windowing means 140 to indicate when an object center position ("heart") has been found, the value of the corresponding horizontal pixel position of this "heart", and the vertical span of the object.

Figure 3A:
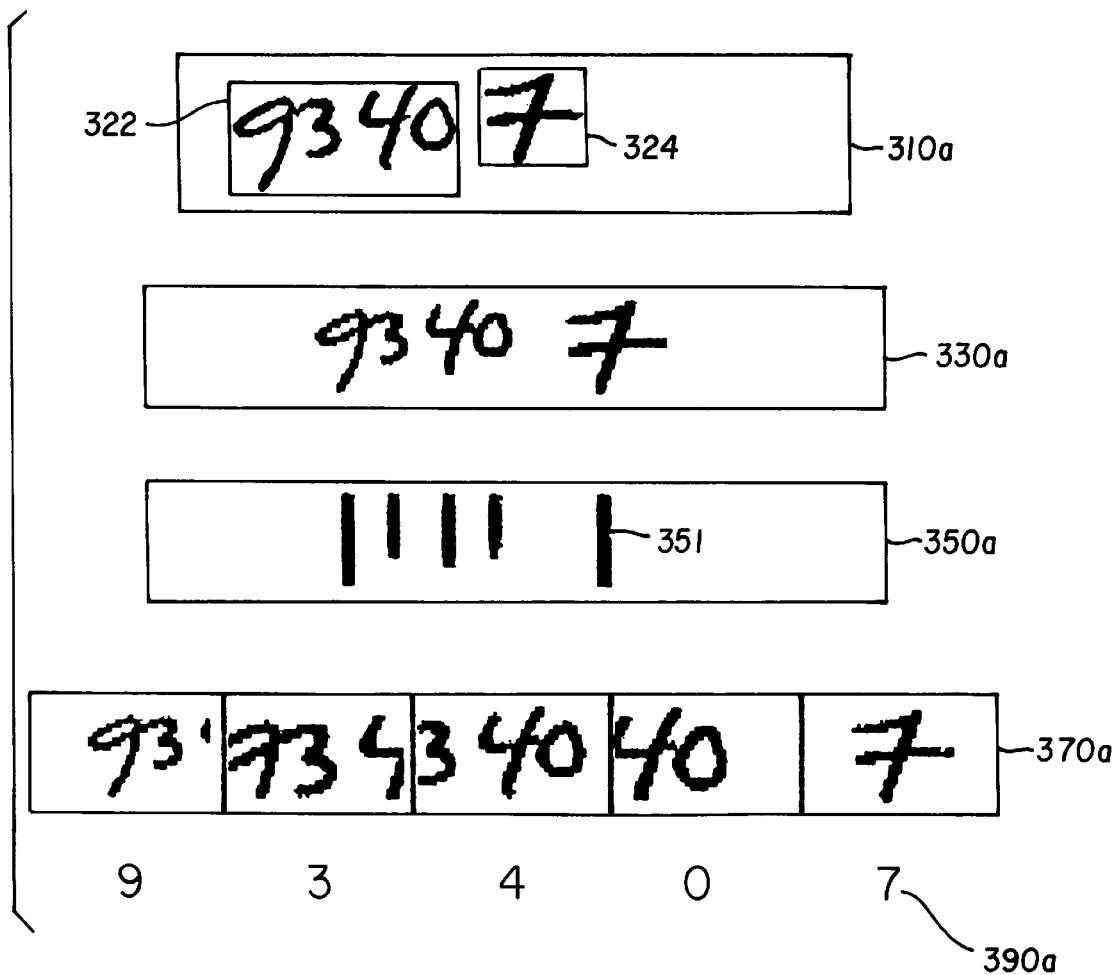
FIGS. 3a–3d diagrammatically depict the sequences of high-level operations performed by the system of FIG. 1, on different illustrative input fields of characters.

Once the "hearts" and spans for all the objects in the field have been found, as indicated for field 330 by solid vertical black bars (e.g., bar 351) in illustrative waveform 350a in FIG. 3a, and appropriate notification has been provided thereof over path 158 to an object normalization and window centering means 144 of the image and object windowing means 140 shown in FIG. 1, for each detected object heart, the object normalization and window centering means 144 of the image windowing means 140 (i) normalizes the height the object based on its span and (ii) passes a window (e.g., a 24-pixel by 24-pixel portion) thereof, centered about the object heart, via path 147, to object classification means 160.

This object classification means 160, also illustratively a Learning mechanism trained to classify an object (e.g., a classification neural network) 165 (illustratively shown in FIG. 2b and discussed in detail below), classifies the object within each 24-pixel by 24-pixel field portion, all of these portions for field 330a shown in FIG. 3a being collectively identified as portions 370a. The learning mechanism trained to classify an object 165 has been trained to recognize single objects. If the learning mechanism 165 is a classification neural network, the output of the classification neural network 165 is a series of output activations, each such output corresponding to a separate candidate object for which this particular classification neural network 165 has been trained. The object classification means 160 also produces a measure of the confidence at which the object classification means 160 has classified the object currently applied to it. The confidence measure may be determined as a conventional function of the activation output values from classification neural network 165. The confidence measure may be determined as outlined in co-pending U.S. patent application Ser. No. 08/361,391, filed on Dec. 21, 1994, and entitled "An Evidential Confidence Measure and Rejection Technique for Use in a Neural Network Based Optical Character Recognition System" (incorporated herein by reference).

To validate the character recognized by the object classification means 160, position and span postprocessing means 156 also routes the horizontal pixel position, in the field, of each detected object "heart", via path 159, to postprocessing means 170. In addition, position and span postprocessing means 156 also provides the combined object-heart index value, $\chi$, for that object "heart" to postprocessing means 170.

Postprocessing means 170 preferably implements a relatively simple rule-based two-level reject process in generating an output object string given the outputs provided by object classification means 160 and position and span determination means 150. The first level is associated with characteristics of the object-heart index waveform, i.e. the $\chi$-wave itself, while the second level, particularly aimed at rejecting dubious objects, is associated with a confidence value generated by object classification means 160 for the object that has been classified. These levels can function on an inter-related basis, as described below.

On the first level of the two-level rejection process, if the combined object-heart index identifies an activation group that is sufficiently high and wide to indicate an object "heart", but the highest individual object-heart index, i.e., $\chi$-value, in the group is lower than a pre-defined threshold, postprocessing means 170 generates a reject signal (not specifically shown). In this case, a human operator can determine what exactly caused the rejection. Alternatively, if position and span determination means 150 cannot find an object "heart" within the boundaries of a corresponding sub-image, the postprocessing means 170 also generates a rejection signal. This latter situation may occur in response to a "clump" of scanner noise, or to an extremely wide or unusual object for which the learning mechanism 152 has not been trained.

Additionally, postprocessing means 170 determines and monitors the width of each sub-field based upon boundary address information provided, via path 137, from image reassembling means 130. If the number of separate object "hearts" detected by position and span determination means sub-system 150 is inconsistent with the sub-field width, i.e. is greater than that which would be expected for a given width, then postprocessing means 170 may also generate a rejection signal.

If two adjacent object "hearts" are too close to each other, postprocessing means 170 will preferably organize "competition" between two detected object "hearts" and decide the valid object(s) based on pre-defined rules. For example, if the distance from one competing object "heart" to the next is less than, e.g. ten pixels, and the labels (symbols) of the recognized objects are relatively wide and different, such as either the numeral "2" or "5" (or two faces), postprocessing means 170 may ignore, for certain recognized objects, that one of the two objects having the lower combined object-heart index value, i.e. $\chi$-value, but permit both objects to exist if they are both recognized as being the numeral "1" or (two legs) for example.

On the second level of the two-level rejection process, if the activation outputs and the confidence measure produced by object classification means 160 are numerically too low, or if these activation outputs are too similar to each other, the corresponding object is also rejected. If a rejection signal is generated during the processing of a field, this field is saved to a separate file (not specifically shown) by postprocessing means 170 for future viewing by a human operator. Within this file, postprocessing means 170 represents position and span determination means 150 subsystem rejections by question marks displayed in corresponding pixel positions of the field, while each rejected object is represented, in ref, by its "best-guess" object symbol. Postprocessing means 170 routes the resulting character string, such as illustrative string 390a shown in FIG. 3a, to output path 25, e.g., for subsequent downstream processing.

Figure 3B:
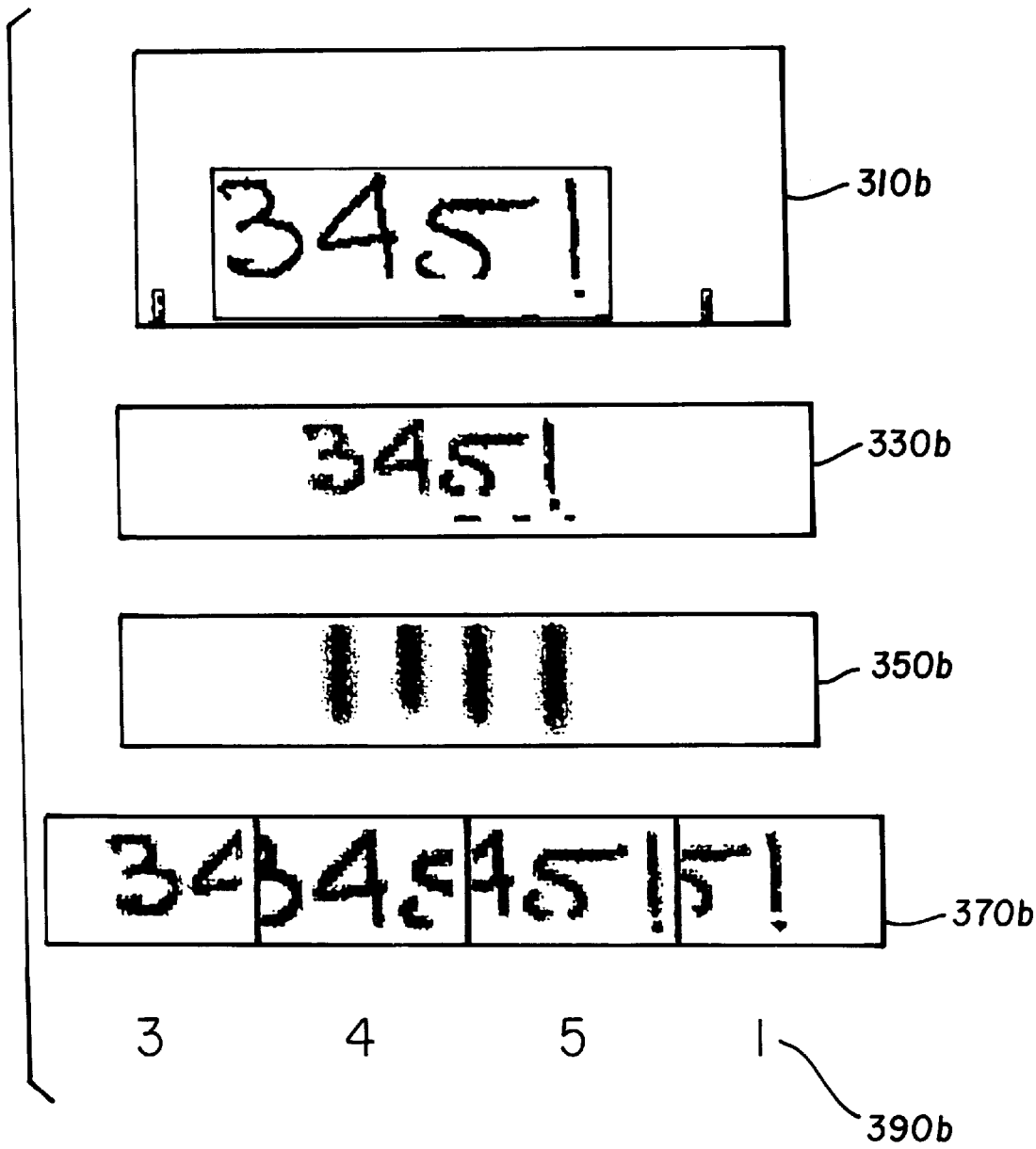
Figure 3C:
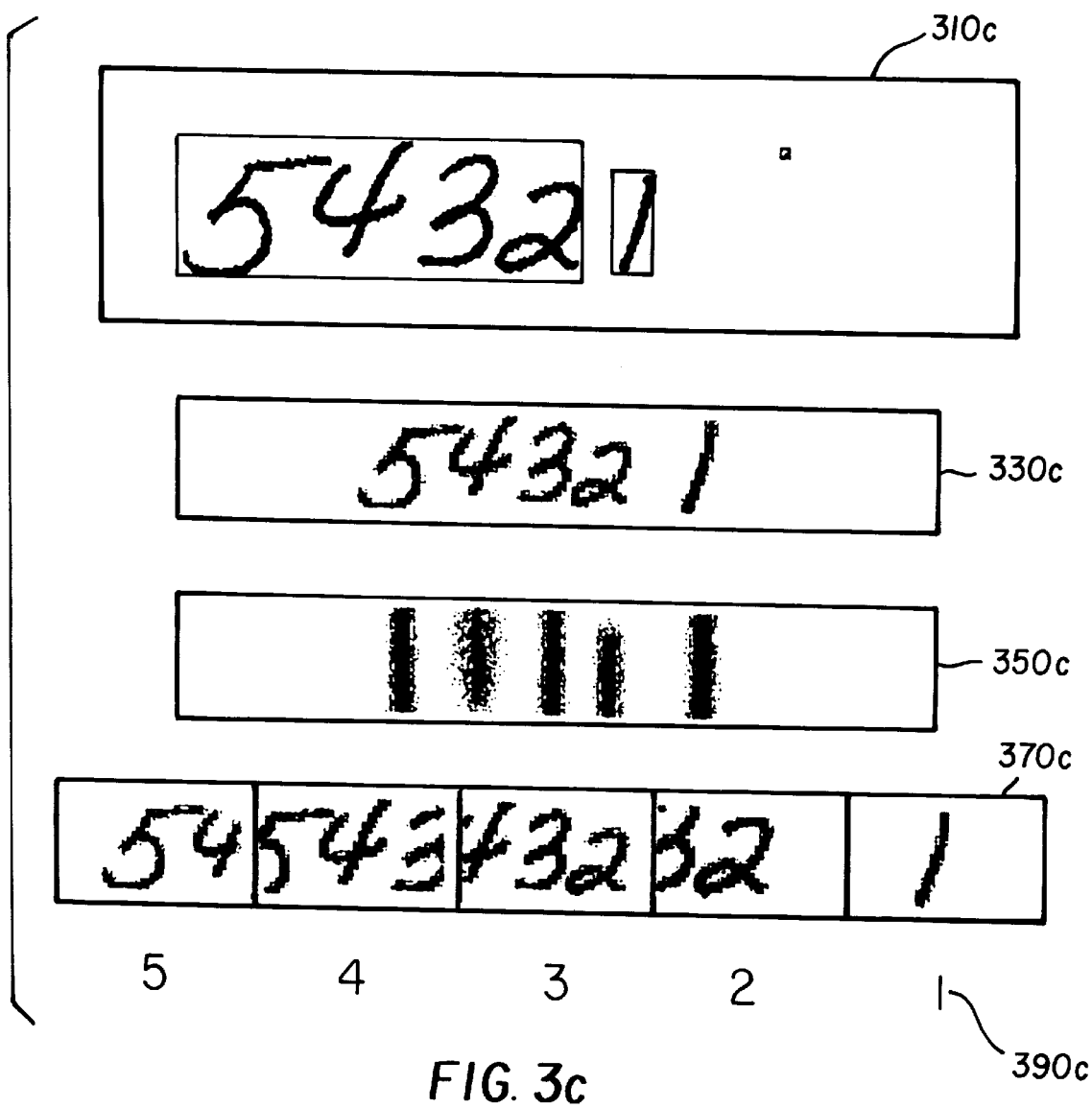
Figure 3D:
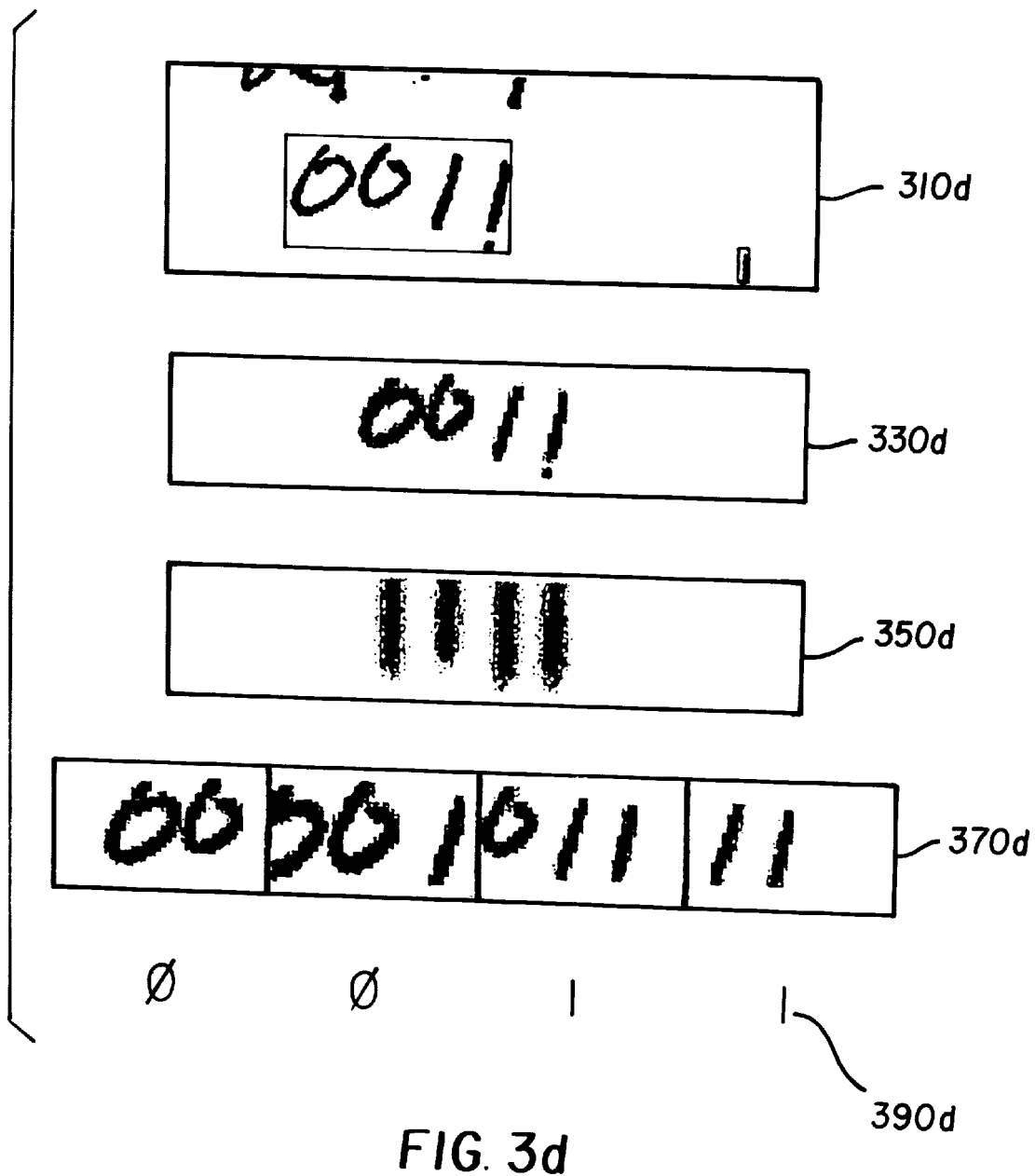

To appreciate the operation of our invention in determining the position of object "hearts" in different situations than that depicted in FIG. 3a, the reader should now consider FIGS. 3b–3d. Each of these latter figures depicts the results of the operations, as described above, for sub-images that contain, e.g., more than one object and, in some instances, touching objects. Since the same operations, discussed above, though with different sub-image data, generate the results shown in these figures, for the sake of brevity, FIGS. 3b–3d are not discussed in any detail.

Figure 2A:
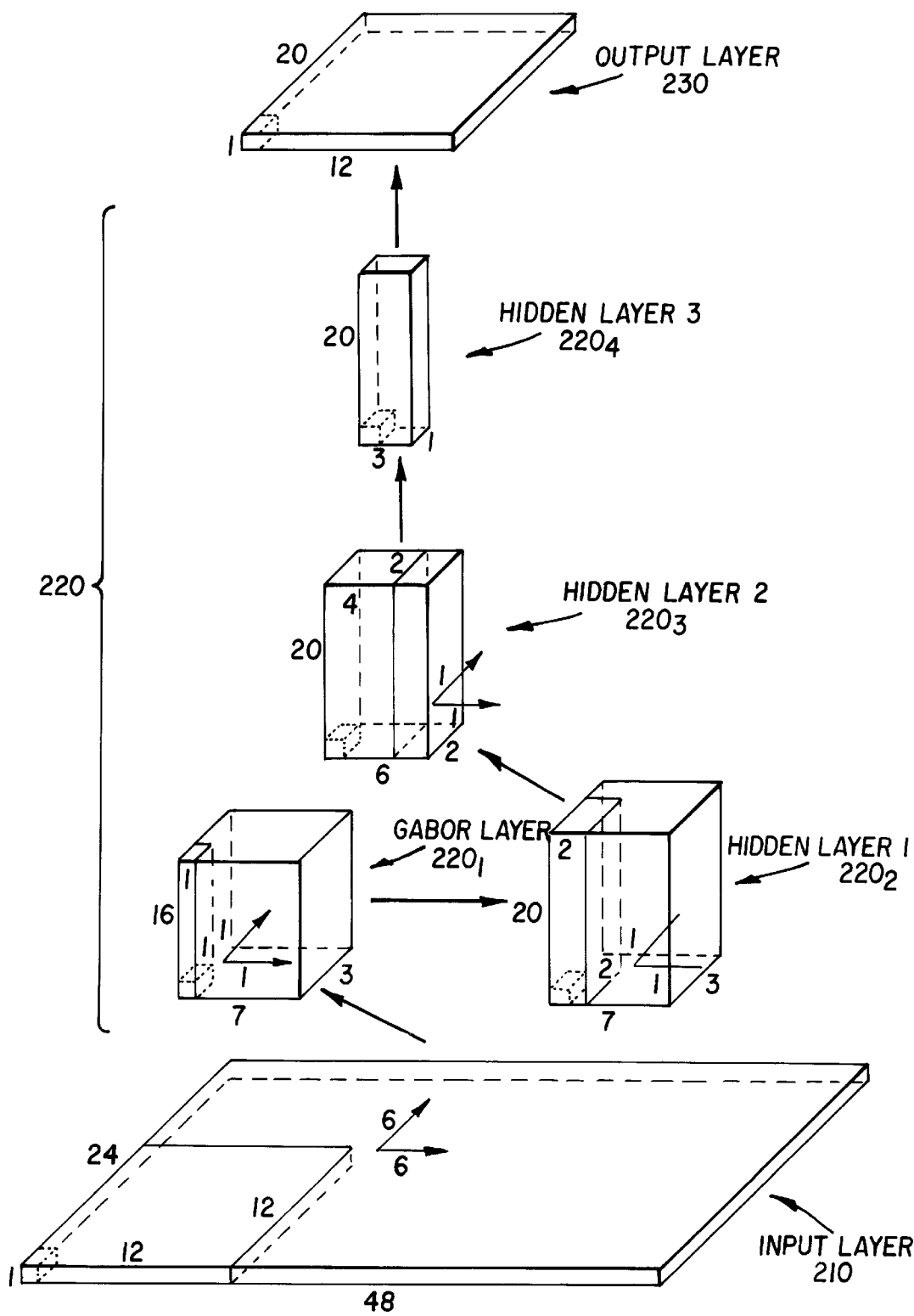
FIG. 2a depicts the topological structure of a position and span determining neural network which may be used in the positioning and span determination means of FIG. 1.
Figure 2B:
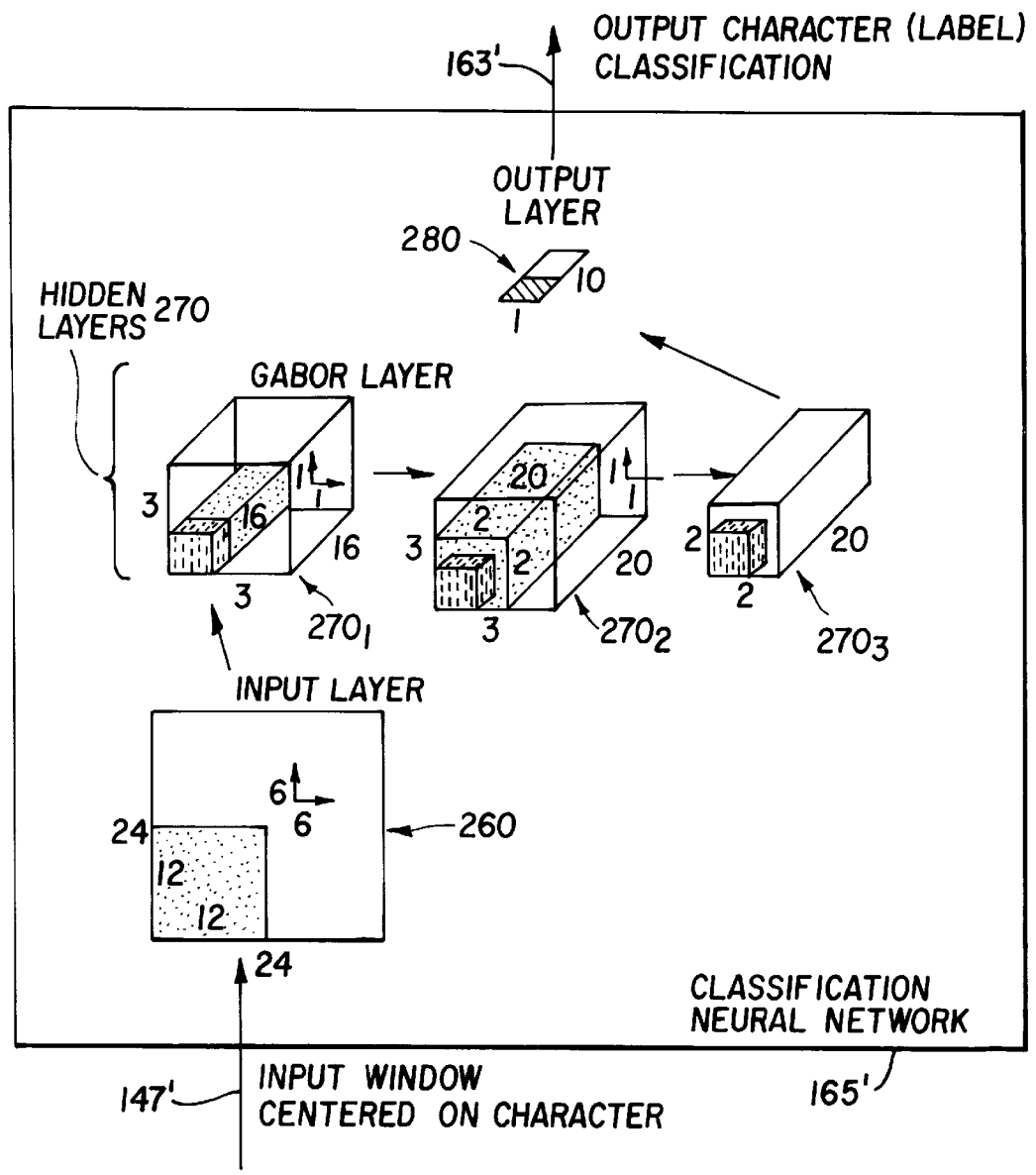
FIG. 2b depicts the topological structure of a classification neural network which may be used in the object(s) classification means of FIG. 1.

FIG. 2a depicts an illustrative topological structure of the position and span determining neural network 152 of FIG. 1. FIG. 2b depicts an illustrative topological structure of the classification neural network 165 of FIG. 1. Each is discussed below.

As shown in FIG. 2a, position and span determining neural network 152 is formed of six distinct layers: 24-pixel high by 48-neuron wide input layer 210, four hidden layers 220 and 12 by 20 neuron output layer 230. As the window traverses, in stepped fashion (with the step size being 12/m where m is an integer), across the input field 310, at each resulting location of the window, each pixel in the "windowed" portion of the field, i.e. underlying the window, is applied to a corresponding input neuron in input layer 210. The outputs of the input neurons in layer 210 are applied, as input, to hidden layers 220, formed in succession of Gabor layer $220_1$ and trainable hidden layers $220_2$, $220_3$ and $220_4$. Gabor layer $220_1$ implements Gabor projections and uses 12×12 local receptive fields (LRFs) with fixed weights and bias values. The step between adjacent LRFs, in layer 210, is six pixels in both directions. Consequently, the first hidden layer 220 is organized in a three-dimensional array of 3×7×16 neurons. Sixteen Gabor basis functions are preferably used with circular Gaussian envelopes centered within each LRF; we use both sine and cosine wavelets in four orientations and two sizes. For a detailed description of these basis functions, see, e.g., J. Daugman, "Complete Discrete 2-D Gabor Transforms by Neural Networks for Image Analysis and Compression", *IEEE Transactions of Acoustics, Speech and Signal Processing*, Vol. 36, No. 7, pages 1169–1179 (1988). All sixteen projections from each LRF constitute the input to a column of 3 hidden neurons in hidden layer $220_2$; thus, this hidden layer $220_2$ is organized as a three-dimensional array of 3×7×20 neurons. The output of hidden layer $220_2$, in turn, is fed as input to hidden layer $220_3$. This latter hidden layer $220_3$ also uses LRFs, though in layer $220_2$, organized as a three-dimensional array of 2×2×20 neurons with a step of 1×1×0. Units in hidden layer $220_3$ are duplicated twenty times thus forming a three-dimensional array of 2×6×20 neurons. The fourth hidden layer, i.e. layer $220_4$, has 2×4×20 LRFs, with the step 0×1×0. There are 20 hidden units looking at each LRF thus forming a three-dimensional array of 1×3×20 neurons. The neural outputs of layer $220_4$ are fully connected as inputs to neurons in 12×20 neuron output layer 230. The resulting 240 neural activation outputs of layer 230 are applied, via path 154, as output of position and span determining neural network 152.

In the following example, the classification neural network 165 classifies objects as one of the numeric characters "0" through "9". The structure of classification neural network 165 is similar to that of position and span determining neural network 152. In particular, the classification neural network 165 is formed of five distinct layers: 24-pixel high by 24-pixel wide input layer 260, three hidden layers 270 and output layer 280. Each pixel in the 24-pixel by 24-pixel (windowed) field portion produced by image windowing means 140 (see FIG. 1) is applied to the classification neural network 165, via path 147. The size of the input window may differ from this example. For example, the input window may be a 24-pixel high by 36-pixel wide field. Obviously, the number of nodes of the input layer of the classification neural network 165 will depend on the number of data (e.g., pixels) in the input field. More specifically, as shown in FIG. 2b, each pixel in the 24×24 pixel windowed field position is applied to a corresponding input neuron in input layer 260. The outputs of the input neurons in layer 260 are applied, as input, to hidden layers 270, formed in succession of: Gabor layer $270_1$, and trainable hidden layers $270_2$ and $270_3$. Gabor layer $270_1$ implements the Gabor projections, identically as does Gabor layer $220_1$, and uses 12×12 local receptive fields (LRFs) with fixed weights and bias values. The step between adjacent LRFs, in layer 260, is six pixels in both directions. Thus, layer $270_1$ is formed of a three-dimensional array of 16×3×3 neurons. Similar to layer $220_1$, all sixteen projections from each LRF constitute the input to a column of 20 hidden neurons in hidden layer $270_2$; thus, layer $270_2$ is organized as a three-dimensional array of 20×3×3 neurons. Also, layer $270_2$ uses shared weights. The output of layer $270_2$, in turn, is fed as input to hidden layer $270_3$. This latter hidden layer $270_3$ also uses LRFs, in layer $270_2$ with a step of 1×1×0. Units in hidden layer $220_3$ are suitably duplicated thus forming a three-dimensional array of 20×2×2 neurons, for a total of 80-neurons in this layer. The neural outputs of layer $270_3$ are fully connected as input to neurons in 10-neuron output layer 280.

Since tie classification neural network 165' is tailored to classify numerical characters, i.e. "0" through "9", output layer 280 has ten neurons, each of which is associated with a different one of the ten numerical characters. The resulting ten neural activation outputs of layer 280 are applied, via path 163', as output of classification neural network 165'.

Although the above example illustrates a classification neural network 165' used when the objects are numerical characters, with a suitable number of output neurons and an appropriate network topology, the classification neural network 165' could alternatively be trained to classify objects from a different set of candidate objects.

The position and span determining neural network 152 is trained to recognize (i) the horizontal pixel location of an object center ("heart"), and (ii) an associated span for each object within an entire pre-defined set of training objects, as the 24-pixel high by 12-pixel wide array 430 at the center of the sliding window 410 moves across that object. The classification neural network 165 is trained to recognize each individual training object, here illustratively numeric characters "0" through "9", centered within a 24-pixel by 24-pixel sub-field. Illustratively, both of these networks are trained through conventional back propagation using pre-defined training sequences, to properly adjust internal weights and bias values of neurons within the hidden layers therein. Since the particular manner through which each of the neural networks is trained is not particularly pertinent to our invention, this aspect will not be discussed in any further detail. Since back propagation is a conventional method for training neural networks and is widely known in the art, for additional details on back propagation, the reader is simply referred to, e.g., D. E. Rumelhart et al, *Parallel Distributed Processing*, Vol. 1, pages 328–330 (© 1988, MIT Press) and J. A. Freeman et al, *Neural Networks—Algorithms, Applications and Programming Techniques*, pages 89–125 (© 1991: Addison-Welsey Publishing Company, Inc.).

Figure 4:
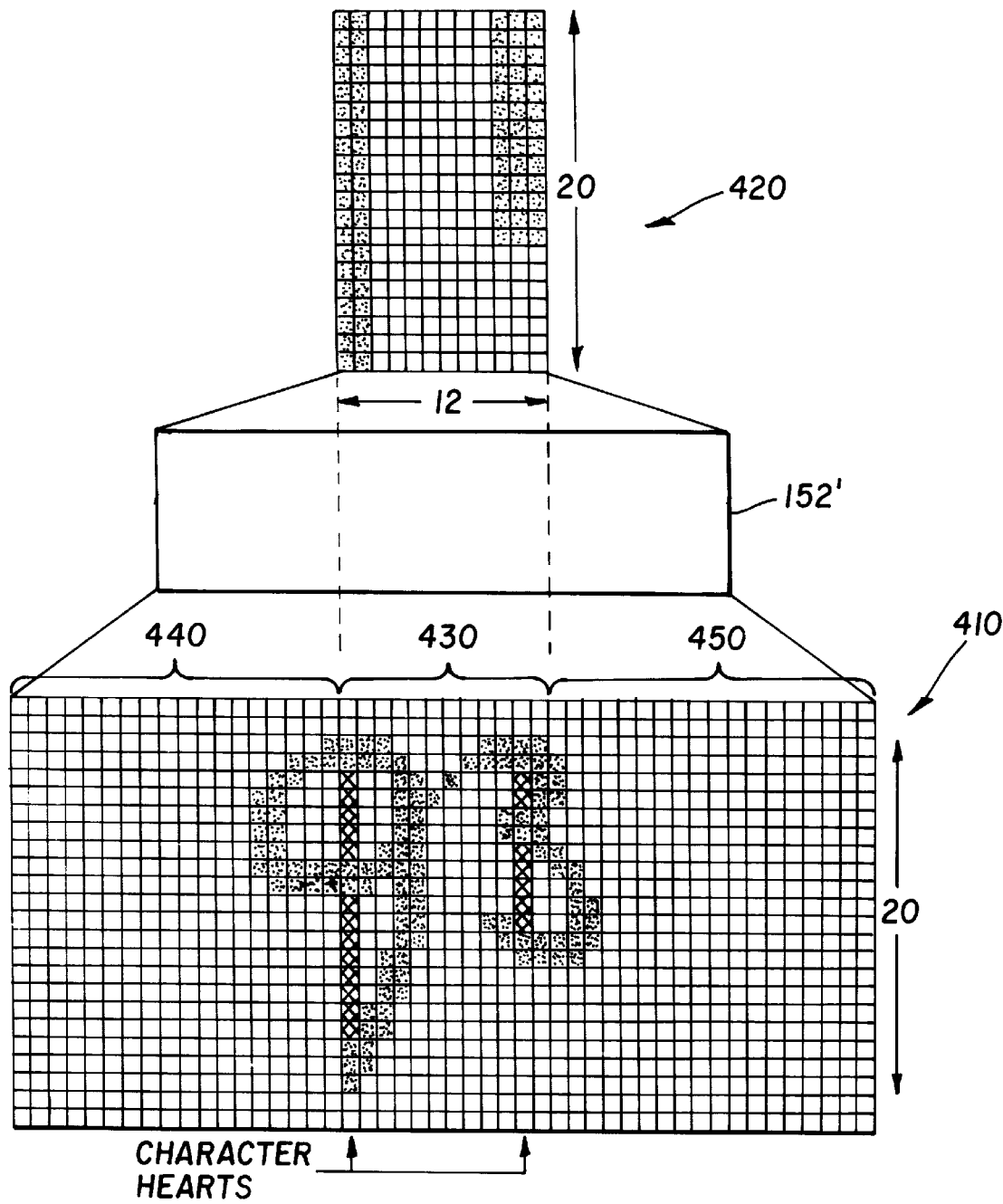
FIG. 4 diagrammatically depicts two illustrative characters in an input field applied, via a sliding window, to the position and span determining neural network, of FIG. 2a, and the positional correspondence of the output nodes of this neural network relative to a current position of the window with respect to the input field.

FIG. 4 diagrammatically depicts: (i) two illustrative scaled characters, specifically numerals "9" and "3", in an input field applied, via a sliding window 410 formed of a 24×48 pixel array, to position and span detecting neural network 152'; and (ii) the positional correspondence of the output nodes 420 of this neural network relative to a current position of the window 410 with respect to the input field. As discussed, input nodes 410, of the position and span determining neural network 152, receive data from the array of 24×48 pixels over which the window is positioned. This array can be viewed as containing central 24×12 pixel array portion 430 situated between 24×18 pixel array portions 440 and 450. The position and span determining neural network 152', though receiving pixel data from the full array of 24×48 pixels, determines whenever the 24×12 central portion 430 of the sliding window is situated over a center, i.e. "heart" of an object(s), such as the numerals "9" and "3" shown here as having centers then positioned over horizontal pixel positions 19 and 29 within the sliding window. When that occurs, the output node(s), here illustratively output nodes in column 1 and rows 1 through 20 and in column 11 and rows 8 through 20 designated by shading, corresponding to the particular horizontal pixel positions within central window portion 430, produces a high valued activation output to indicate that at that window position in time tile object(s) "hearts" have a span which exist at those pixel positions. In addition, immediately adjacent output nodes columns, here illustratively nodes columns 2, 10 and 12, are also trained to each produce a high-valued activation output at rows corresponding to the spans. All the other output nodes produce a low level, i.e. zero, activation output; and so forth for object "hearts" coincident with other pixel positions in central portion 430.

As the window is slid (or stepped) to the right over these objects, the objects will in effect move to the left relative to the window. Hence, the high level output activations corresponding to the span of each object "heart" will also shift, by the positional amount through which the window steps to the right, to increasingly leftward output nodes, until that object "heart" is no longer coincident with any pixel position within central portion 430.

Figure 5:
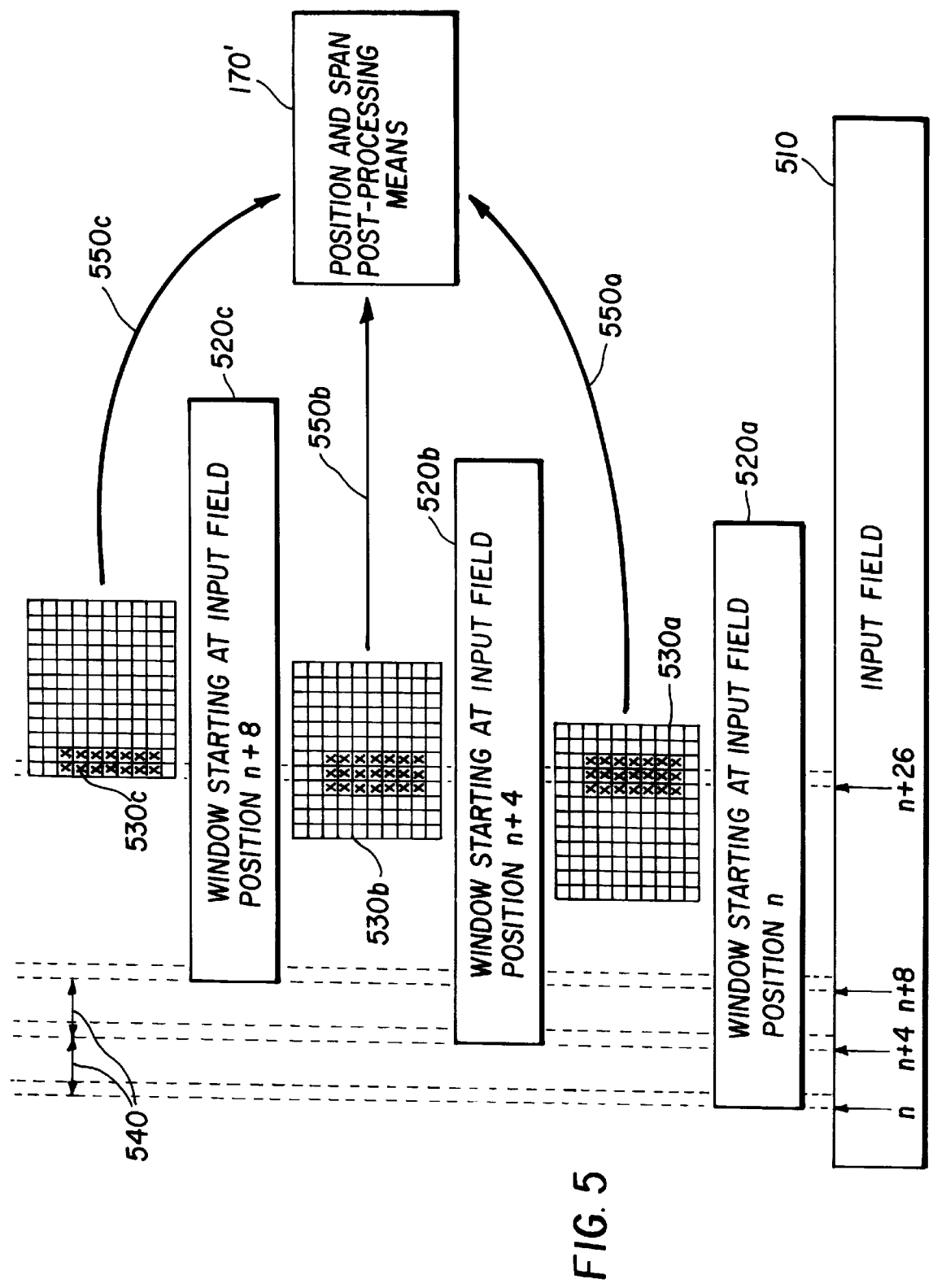
FIG. 5 depicts the neural activation outputs of a window as the window is stepped across an input field.

FIG. 5 illustrates the relationship between positional shifts in a sliding window 520 with respect to an object "heart" coincident with the window 520. Due to the lack of space and for purposes of clarity in the drawing, each box of the activations 530 represents 2-pixels of span by 1-pixel of horizontal position. More specifically, FIG. 5 diagrammatically depicts the neural activation outputs of a 20 pixel high by 36 pixel wide sliding window 520 for an illustrative step size 540 of four pixels, as that window 520 traverses, in a step-wise fashion, across the input field 510. The window 520 is stepped, at four pixel increments, across an input field 510, from starting (leftmost) position n, to position n+4, to finally position n+8. Assume, for purposes of illustration, that an object (not specifically shown) is centered about, e.g., illustrative pixel position n+26 within the input field 510 and, on average, the object spans from a third pixel to a sixteenth pixel. Consequently, as the window 520 steps across the object to effectively form at correspondingly different times windows 520a, 520b and 520c, the "heart" of this object, through the entire position and span determining neural network, will produce high output activations 530 for output nodes corresponding to pixels marked by "X" in FIG. 5 for each of the three steps (e.g., pixels at rows 3 through 16 of columns 9, 5, and 1, spaced at four pixel increments. As discussed above, high output activations of columns adjacent to character hearts (e.g., columns 8 and 10 of 530a, columns 4 and 6 of 530b, and column 2 of 530c) may also be produced. This results by virtue of the object "heart", situated at pixel position n+26 in the input field 510, being spatially coincident, at successive times, with corresponding horizontal column pixel positions 9, 5 and 1 within the central portion of the sliding window 520 and associated with output nodes of rows 3 through 16 of columns 9, 5 and 1 respectively, of the positioning neural network.

The pixel positions of central (20 high by 12 wide) portion of the sliding window 520 is represented by window portions 530a, 530b and 530c. The three different activation outputs for the common pixel position, n+26 and span 3 through 16, in the input field 510, are provided, via paths 550, to position and span postprocessing means 170'. The activation outputs 530 may then be combined through a weighted average for example. A simple non-weighted average can be easily used instead.

If the step size 540 were decreased, such as to two pixels, then each horizontal pixel position in the input field 510 would be coincident, with an increased number of pixel positions, here six, within the central portion of the sliding window 520 as the window 520 slides across the field. Hence, a correspondingly larger number of separate output activations, here six, would be averaged together, for any one horizontal pixel position in the input field. As noted above, use of a smaller step size does produce an increasingly accurate average and hence increased positioning accuracy, though at a cost of increased processing time needed to form each of these averages.

Once the average for each horizontal pixel position and span in the input field 510 is determined, the averages may then be digitally filtered, to remove irregularities and, by doing so, provide enhanced robustness. This filtering (smoothing) may involve averaging activations in a 3-pixel by 3-pixel window to produce a character-heart and span index value.

After the character-heart index, $\chi$, values are determined, these values may be thresholded to remove artifacts thereby forming a thresholded activation group, with those index values having an amplitude lower than the threshold, being rejected and set to zero. The threshold is pre-defined but empirically chosen. Furthermore, if only one pixel position (or a very small number of such positions) has a high amplitude, while the others are below the threshold, then the detected character, being too narrow, is likely to be noise and is rejected and also set to zero.

To reliably determine the pixel position of the object's "heart" from the thresholded activation group, a weighted average, such as a center-of-mass calculation for example, of the individual thresholded activation values may be calculated. First, a normalization factor, D, is determined for the thresholded activation group. This factor may be determined by summing the thresholded activation output levels in this group to form a sum of these values for which the normalization factor is then calculated as the reciprocal of the sum. Once the normalization factor is determined, each activation output level is multiplied by the normalization factor, D. The resulting normalized values are then weighted by a numeric value representing the horizontal pixel position. The top and bottom of the "swell" of thresholded activations are used to determine an average vertical span of the object.

The filtering and thresholding may be carried out based on the manner described in U.S. Pat. No. 5,542,006.

Figure 6A:
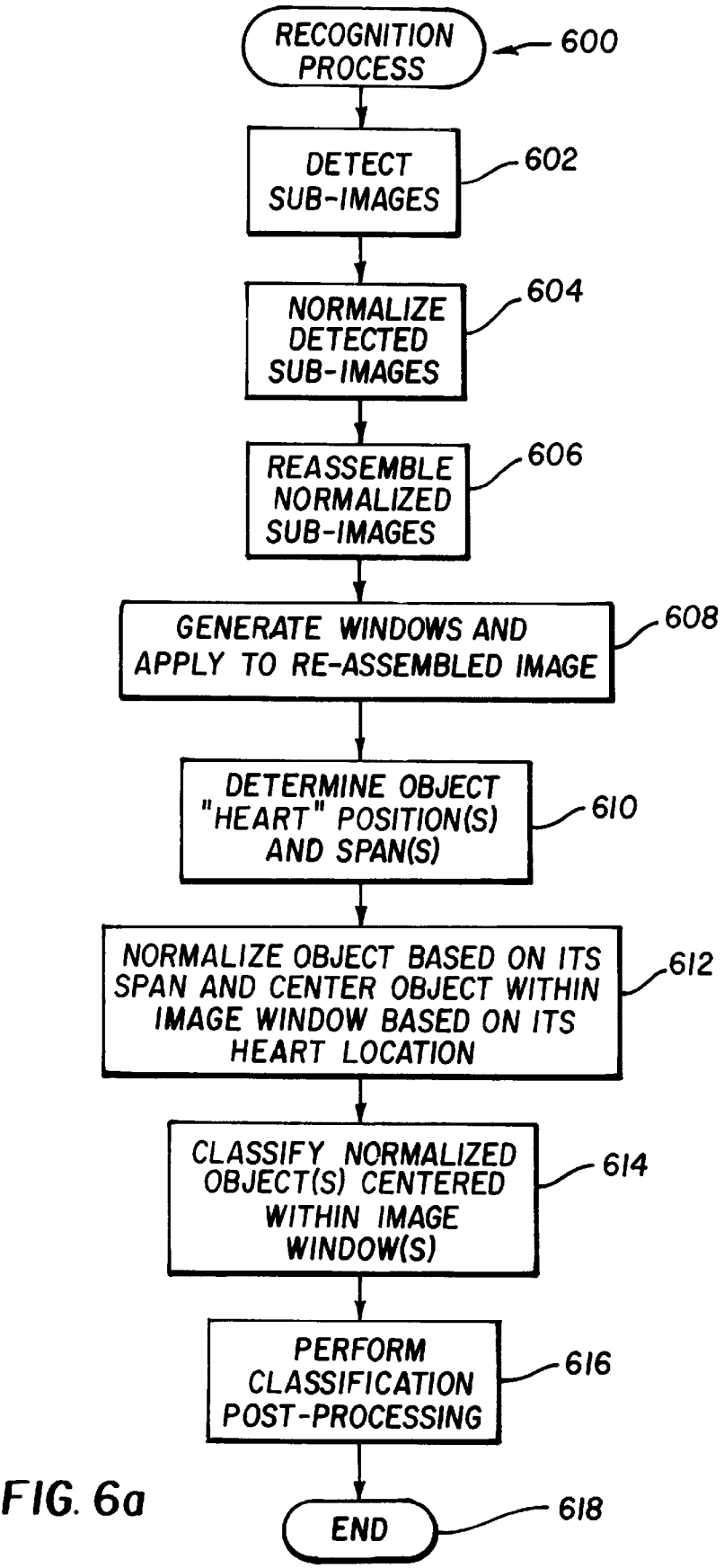
FIG. 6a is a flow diagram of a recognition process.

FIG. 6a is a flow diagram which illustrates a recognition process 600 which may be carried out by the system 100 of FIG. 1. First, as shown in step 602, sub-images of an image are detected. This step may be carried out by sub-image detection means 110 discussed above with reference to FIG. 1. Next, as shown in step 604, the detected sub-images are normalized. This step may be carried out by sub-image normalization means 120 discussed above with reference to FIG. 1. Then, as shown in step 606, the normalized sub-images are reassembled. This step may be carried out by image reassembling means 130 discussed above with reference to FIG. 1. Each of the above steps may be performed in conventional ways.

As shown in step 608, windows are generated and applied to the reassembled image. This step may be performed by the stepped image window generation means 142 of the image windowing means 140 discussed above with reference to FIG. 1. The windows of the reassembled sub-image are processed, as shown in step 610, to determine, for each object in the reassembled image, an object heart position and a span of the object. This step may be performed by the position and span determination means 150 discussed above with respect to FIGS. 1, 2a, 4, and 5.

Figure 6B:
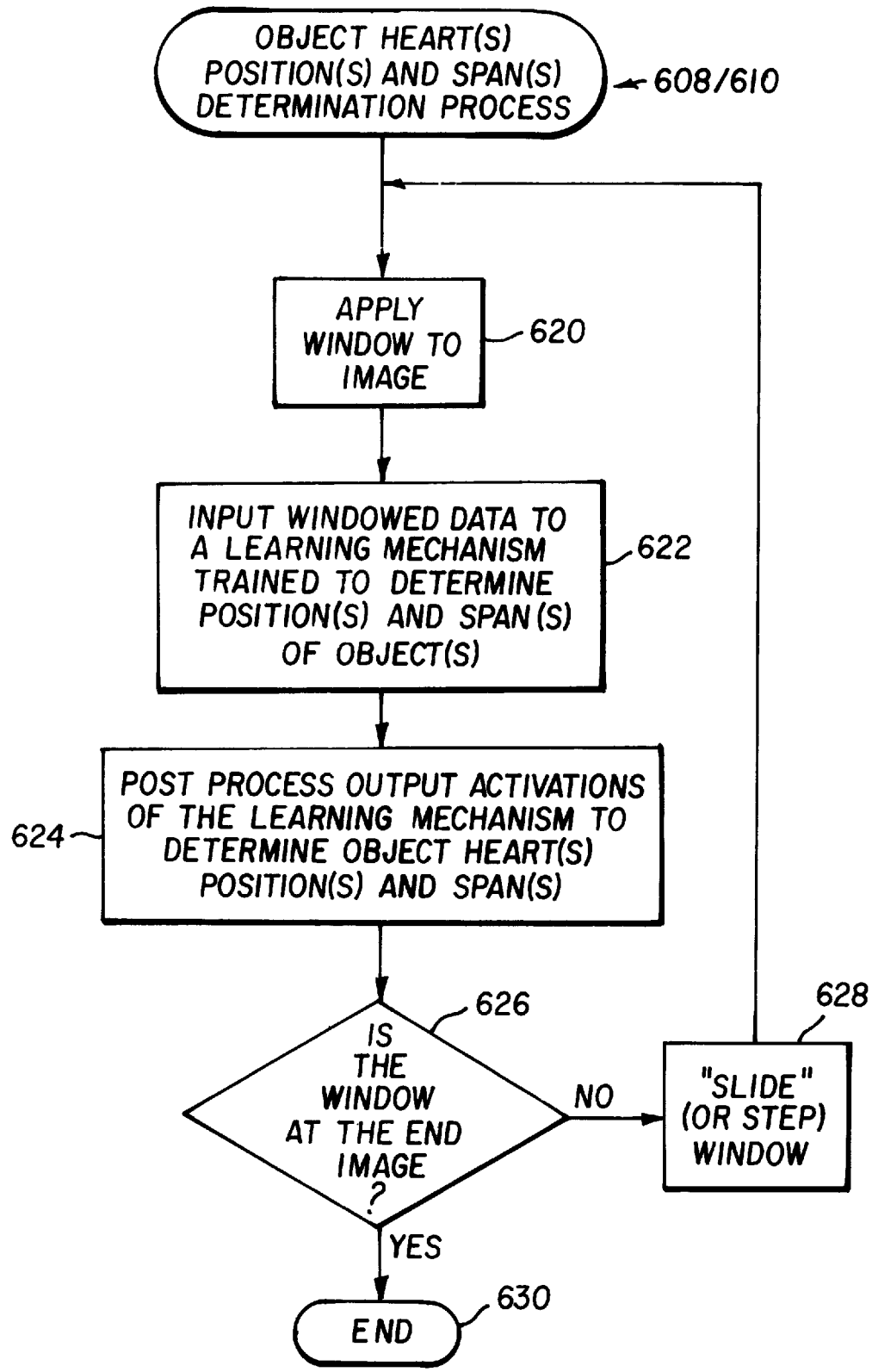
FIG. 6b is a flow diagram of an object heart position and span determination process.

Referring now to the flow diagram of FIG. 6b, the image window generation and the object heart position and span determination steps 608 and 610 of FIG. 6a are further described. First, as shown in step 620, a window is applied to the reassembled image. This step may be carried out by the stepped image window generation means 142 of the image windowing means 140. Next, as shown in step 622, the windowed data of the reassembled image is provided as an input to a learning mechanism trained to determine the position(s) and span(s) of object(s) (e.g., neural network) via path 143 of FIG. 1. The trained learning mechanism (e.g., the position and span determining neural network 152 discussed above with respect to FIGS. 1, 2a, and 4) will generate output activations in response to the input windowed data. Next, as shown in step 624, the output activations are processed (e.g., by position and span post processing means 156 discussed above with reference to FIG. 1) to determine, for each object of the image, the position of the object's heart and the span of the object. As shown in steps 626, 628 and 630 the window is repeatedly slid (or stepped) across the reassembled image until the end of the reassembled image is reached. These steps may be performed by the stepped image window generation means 142 of the image windowing means 140 discussed above with reference to FIG. 1. Steps 620, 622, and 624 are repeated for each window.

Figure 6C:
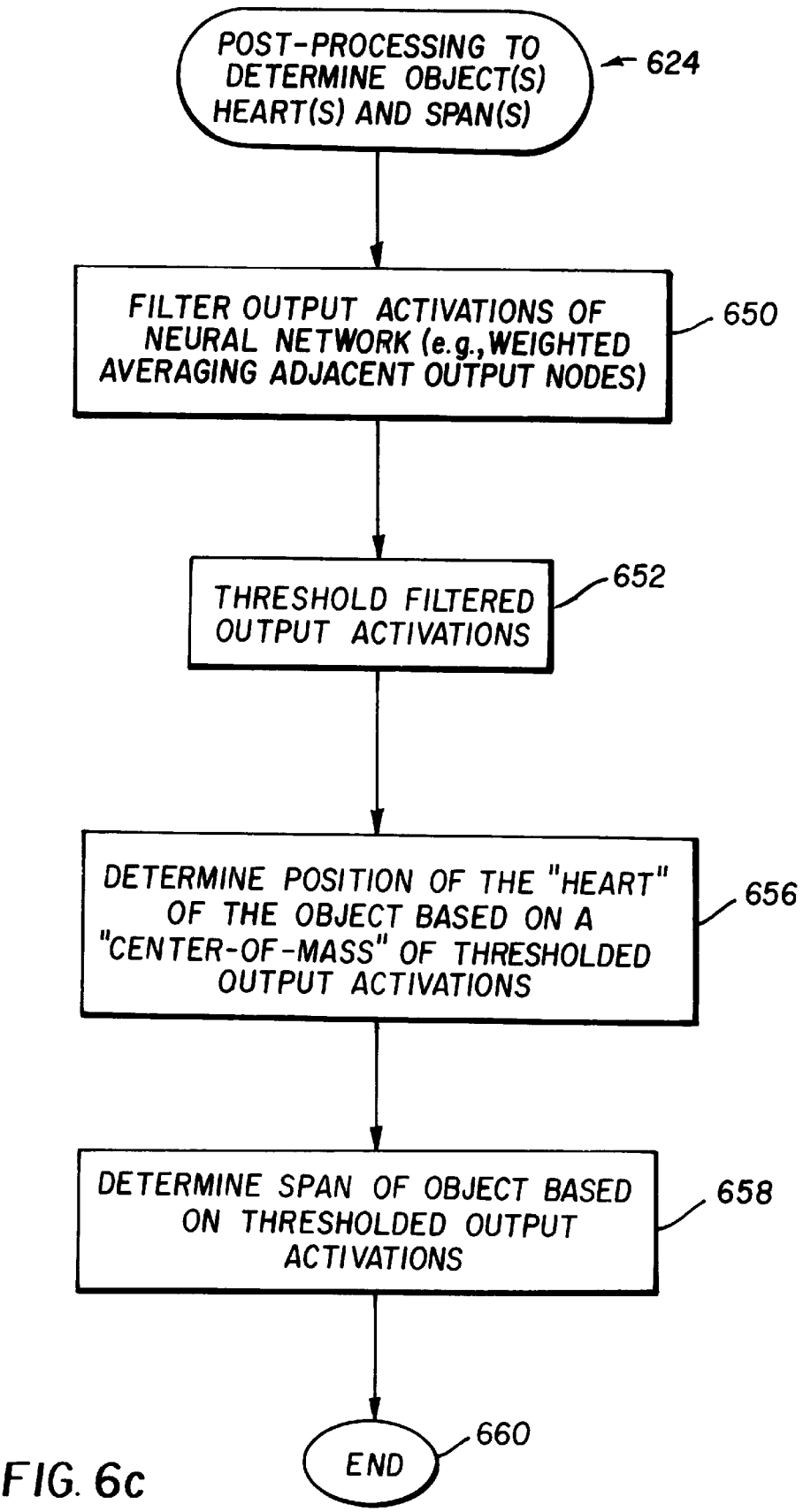
FIG. 6c is a flow diagram which illustrates post-processing to determine the heart and span of an object.

Referring to the flow diagram of FIG. 6c, the post processing step to determine the heart position and span of an object 624 of FIG. 6*b* is further described. First, as shown in step 650, the output activations of the learning mechanism trained to determine position(s) and span(s) of object(s) (e.g., neural network 152) are filtered (e.g., smoothed by applying a weighted averaging of adjacent nodes). Next, as shown in step 652, the filtered output activations are thresholded. As shown in step 656, the center of mass of the thresholded output activations is calculated to determine the position of the object's heart. Finally, as shown in step 658, the span of the object is determined based on the top and bottom of the thresholded output activations.

Referring back to FIG. 6*a*, as shown in step 612, each object in the reassembled image is (i) normalized based on its span, and (ii) centered within an image window based on the location of its heart. These steps may be performed by the object normalization and window centering means 144. Next, as shown in step 614, the normalized object centered within the image window is classified. This step may be carried out by the object classification means 160 based on windows, whose position is based on the position of the object's heart, of the reassembled image. Finally, as shown in step 616, classification post processing may be performed to determine whether the confidence of the classification is great enough to consider the classification valid. This step may be carried out by the post processing means 170 discussed above with reference to FIG. 1.

Figure 7:
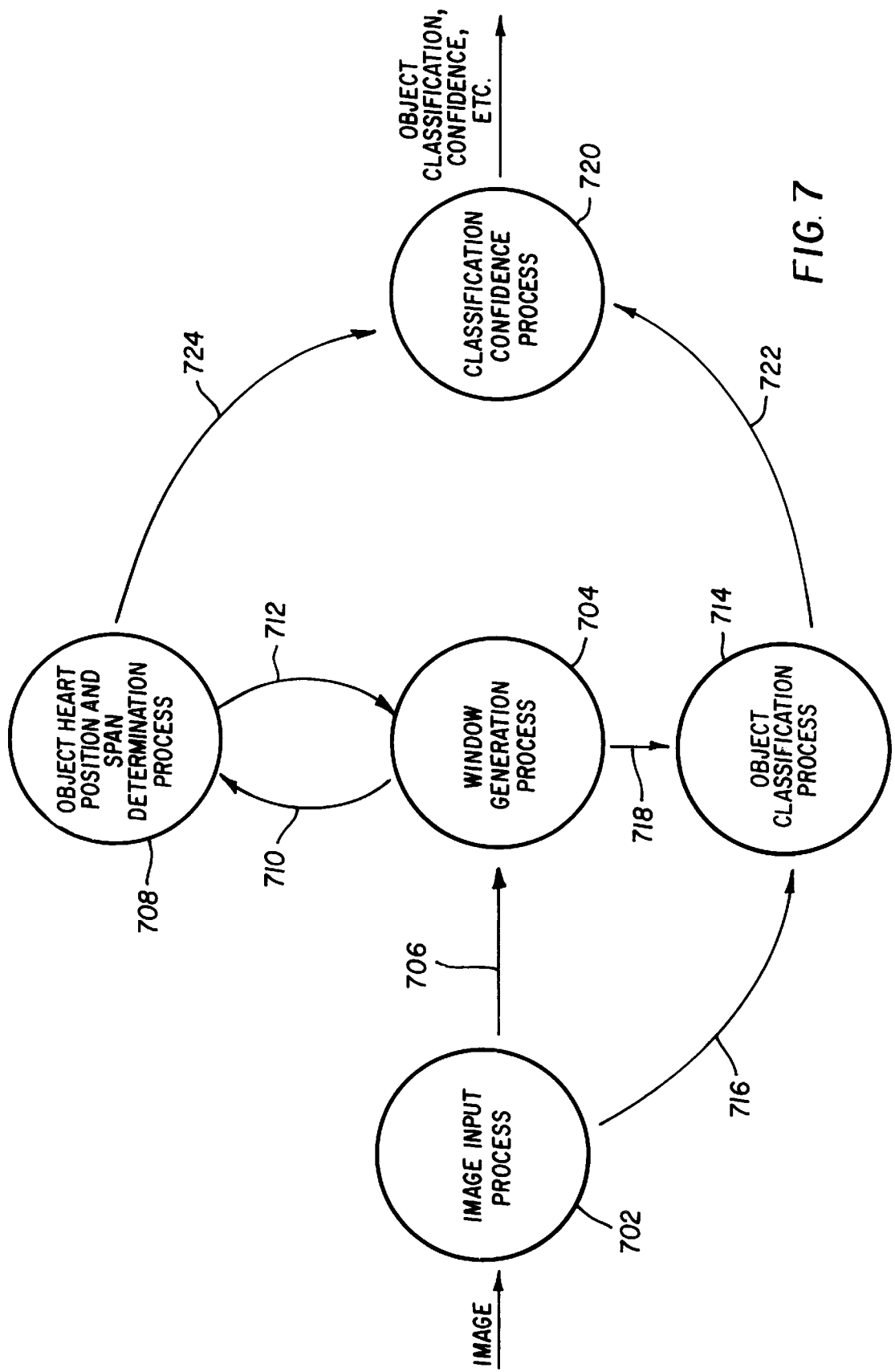
FIG. 7 is a process bubble diagram of an object recognition system in accordance with the teachings of the present invention.

FIG. 7 is a process bubble data flow diagram of the system of the present invention discussed above with reference to FIG. 1. The image input process 702 accepts an image. The image may have been previously digitized, or, the image input process 702 may digitize the image. In addition, the image input process 702 may detect sub-images, normalize the detected sub-images, and reassemble the normalized sub-images. (See e.g., steps 602, 604, and 606 of FIG. 6*a*.) The reassembled image is provided, via path 706, to window generation process 704.

The window generation process 704 performs two (2) main functions. First, the window generation process steps a window across the reassembled image and provides data, corresponding to each window step, as an input to the object heart position and span determination process 708 via path 710. (See e.g., steps 620, 622, 626, and 628 of FIG. 6*b*.) The object heart position and span determination process 708 then determines, based on the collection of data corresponding to each window step, the heart position(s) and span(s) of object(s) in the reassembled image. (See e.g., FIG. 6*c*.) This information is provided back to the window generation process 704 via path 712. In its second main function, the window generation process 704 normalizes each object based on associated span information and centers a window over the normalized object based on associated heart position information. These windows, positioned over the heart of normalized objects, are provided, via path 718, as inputs to object classification process 714.

The object classification process 714 attempts to classify each object and provides its classification determination, and optionally a confidence measure (see e.g., step 612 of FIG. 6*a*) to the classification confidence process 720 via path 722. The classification confidence process 720 also accepts data from the object heart position and span determination process 708 via path 724. Based on this information, the classification confidence process 720 provides an object classification and a confidence associated with the classification. (See e.g., step 614 of FIG. 6*a*.)

Figure 8A:
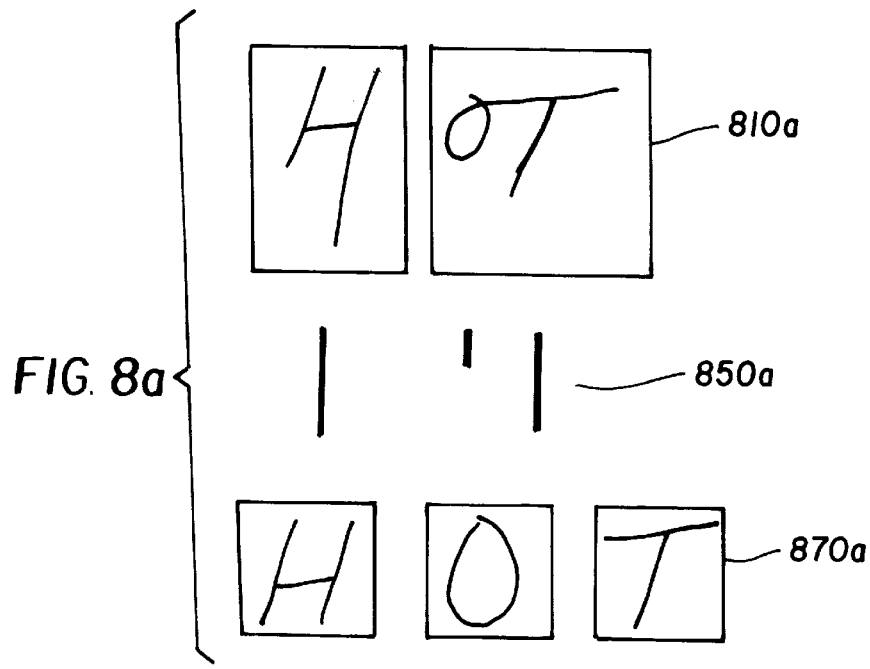
FIG. 8a diagrammatically depicts the sequence of high-level operations performed by the system of FIG. 1 on an input field having touching characters, and a character with a descender.
Figure 8B:
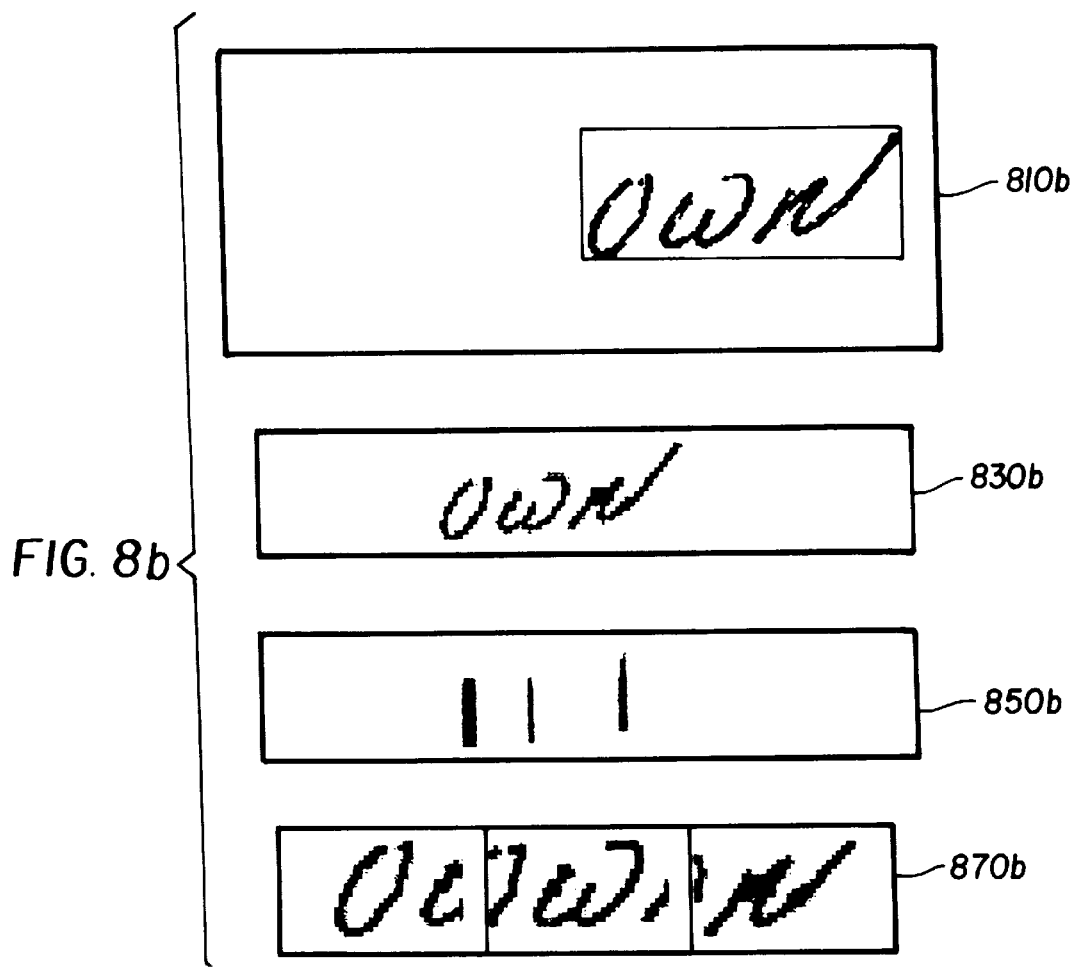
FIG. 8b diagrammatically depicts the sequence of high-level operations performed by the system of FIG. 1 on an input field having a character with an ascender.

Although the present invention is related to the invention disclosed in U.S. Pat. No. 5,542,006, the additional steps of determining an object span and normalizing the object based on the determined span in the present invention make the present invention better suited for classifying characters with "extenders" or "descenders" and for classifying touching characters. For example, FIG. 8*a* illustrates an input field 810*a* having a handwritten word "HOT" in which the second leg of the "H" "descends" and in which the "O" and the "T" touch. As shown by the hearts and spans 850*a* of the characters of the input field 810*a*, the span of the "H" minimizes the effect of the "descender". As shown in the normalized characters of 870*a*, the spans of the "O" and "T" optimize the normalization of each character. FIG. 8*b* illustrates an input field 810*b* having a handwritten word "OWN" in which the end leg of the "N" ascends. Since the characters were not segmented, the characters were normalized as a group as shown in the normalized field 830*b*. As shown by the hearts and spans 850*b* of the characters, the subsequent normalization based on the span of the "N" minimizes the effect of the "ascender". Even if the characters were segmented (which is possible, particularly since they are not touching) and each character was individually normalized based on its outer boundaries, the subsequent normalization based on the determined character span will nonetheless be important in minimizing the effect of the ascender. This is because the initial normalization is based on the outer boundaries of the character, not on an average span of the character.

Figure 9:
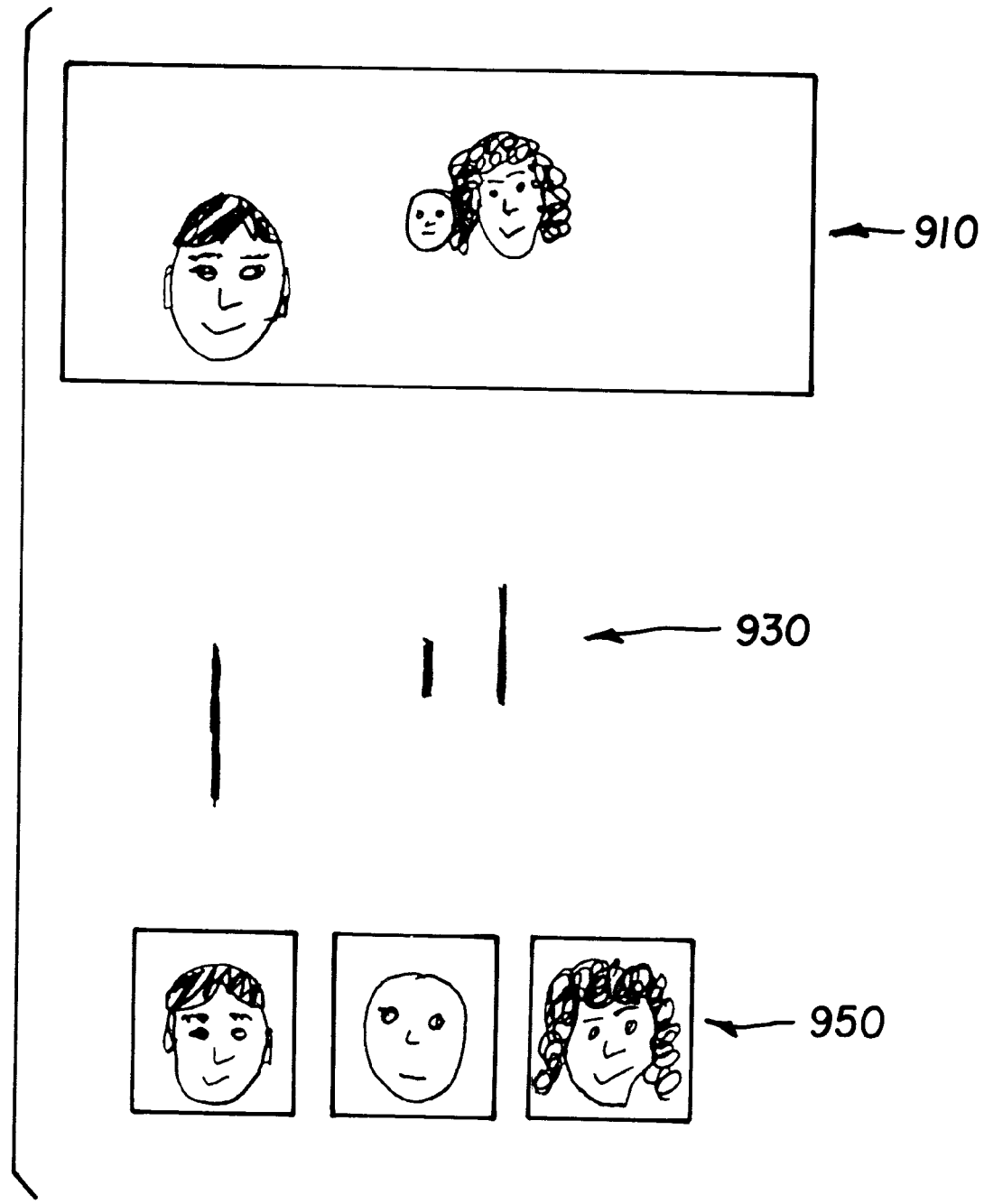
FIG. 9 diagrammatically depicts the sequence of high-level steps performed by the method of the present invention on an input field having images of faces.

FIG. 9 is an exemplary image input field 910 containing faces to be classified. As shown, a man's face is larger than a woman's face and a child's face and the woman's face is touching the child's face. The hearts and spans 930 of the faces allow the faces to be normalized and properly windowed 950 before classification processing.

Figure 10:
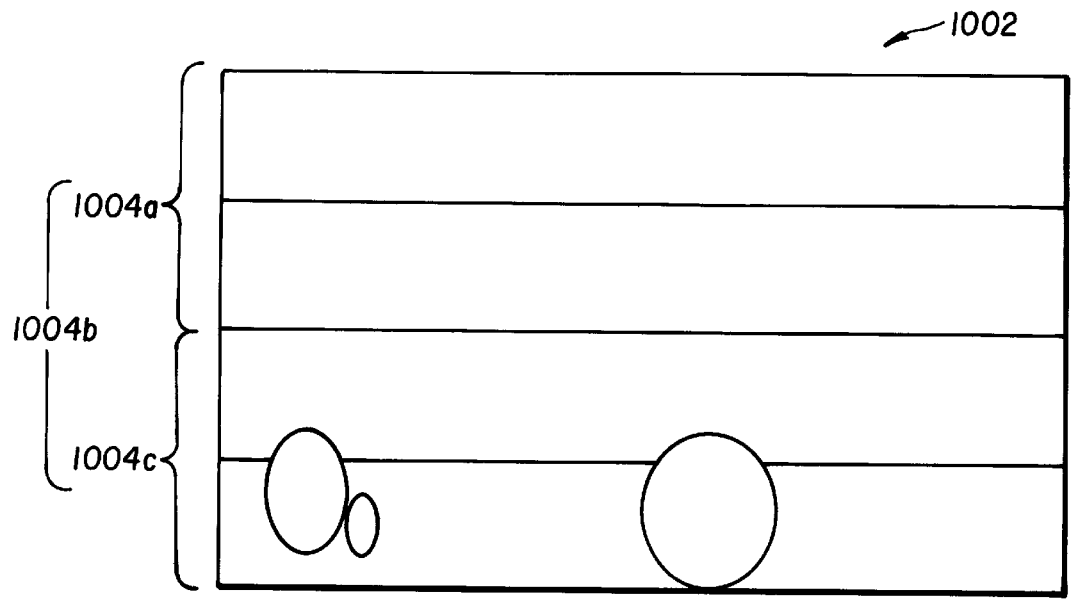
FIG. 10 illustrates a multi-resolution approach for determining a height of an input field.

There may be some instances in which the height of the field in which objects are to be classified is unknown. FIG. 10 illustrates a multi-resolution approach to determining a field height. First, the field height is set to the height of the entire image 1002. If no objects (e.g., object hearts) are found, the field height is set to one half of the height of the image and three (3) one half height fields 1004*a*, 1004*b* and 1004*c* are processed. Since objects (e.g., object hearts) are found in field 1004*c*, the field 1004*c* is now further processed in an attempt to classify the objects. Otherwise, if no objects (object hearts) were found, progressively smaller field heights would be used.

Although the system 100 was described as operating on a sequential basis, i.e. object "hearts" are located for all objects within a field before recognition begins of any of these objects, to expedite processing and provide heightened throughput, our inventive system could also be operated on in parallel. In this instance, after the "heart" and span of a current object was determined, image windowing means 140 (see FIG. 1) would not merely wait for the next object "heart" to be located but instead could parse the image to send a 24×24 pixel field portion (or a window of any desired size) centered about the current object to object classification means 160 for immediate recognition. In this manner, an object could be recognized while the field pixel position of the next object "heart" was being determined. Thus, rather than incorporating a full field delay into the processing—which of course varies based upon the number of separate object "hearts" located in the field, between object "heart" detection and recognition—this delay could be readily decreased to a single object delay through pipelined parallel processing.

Furthermore, although postprocessing means 170 was described as utilizing a relatively simple rule-based, two-level, rejection process to identify and reject erroneous characters, increasingly sophisticated rejection techniques could be used instead. For example, postprocessing means 170 could determine the variance associated with predicted adjacent object (e.g., character) "heart" separations in a document or field and reject those object "hearts" that are statistically too close positionally as compared to other such object "hearts" in the same field or document. Furthermore, if two object (e.g., character) "hearts" were found to be too close together, i.e. separated by six pixels or so, both object "hearts" may be associated with different portions of a large single wide object. For example, a left portion of wide zero may be recognized as a "1" while right portion may be recognized as a "7". In view of the small spacing between these two character "hearts", postprocessing means 170 could instruct image windowing means 140 to re-align the 24×24 pixel field portion to a field pixel position situated between both character portions and then route a resulting parsed pixel field portion to the classifier for re-classification in an attempt to recognize the correct character, i.e. the numeral zero. Re-alignment and re-classification would also be appropriate in instances where object "hearts" are not only too close positionally but are determined with a relatively low statistical confidence level—thereby indicative of ambiguity between the object "hearts" detected and the actual object being recognized.

Although the windows used defined rectangular pixel arrays, a window can be any shape that defines a portion of an image.

Furthermore, by now, those skilled in the art clearly recognize cur inventive teachings can be applied to systems for visually recognizing nearly any pre-defined object with a scanned image produced from any of a wide variety of sources (e.g., a scanned document) to improve the accuracy of the recognition.

Although one embodiment of the present invention has been shown and described in detail herein, many other varied embodiments that incorporate the teachings of the invention may be easily constructed by those skilled in the art.

The present invention is useful in a wide variety of systems that performs pattern recognition. The invention quickly and reliably locates a desired object, such as a character, from within a field of objects, such as a string of characters, such that the desired object can be subsequently recognized. By properly locating the desired object, overall recognition accuracy advantageously increases.

What is claimed is:

1. A method for processing an image containing an object to be subsequently classified, the method comprising steps of:
 a) generating windows;
 b) applying the generated windows to the image to form windowed images;
 c) determining a position of the object by providing the windowed images to a trained learning mechanism;
 d) determining a span of the object by providing the windowed images to the trained learning mechanism;
 e) normalizing the object based on the determined span to form a normalized object; and
 f) centering the normalized object within a classification window based on the determined position,
wherein a subsequent classification of the object may be performed on the classification window.

2. The method of claim 1 wherein the step of generating windows includes sub-steps of:

i) determining a first horizontal position at a first horizontal side of the image;
 ii) applying a window having a predetermined size at the first horizontal position of the image;
 iii) determining a next horizontal position;
 iv) applying a window having the predetermined size at the next horizontal position; and
 v) repeating sub-steps (iii) and (iv).

3. The method of claim 2 wherein the image is defined by a two-dimensional array of pixels, and
 wherein the sub-step of determining a next horizontal position includes a step of moving the window a predetermined number of pixels in a first horizontal direction away from the first horizontal side of the image.

4. The method of claim 1 wherein the the trained learning mechanism is trained to determine the position and span of an object.

5. The method of claim 1 wherein the steps of (c) determining a position of the object by providing the windowed images to a trained learning mechanism, and (d) determining a span of the object by providing the windowed images to a trained learning mechanism, collectively, includes
 the step of post-processing outputs of the trained learning mechanism.

6. The method of claim 5 wherein the sub-step of post-processing outputs of the trained learning mechanism includes steps of:
 A) filtering the outputs of the trained learning mechanism to generate filtered outputs;
 B) thresholding the filtered outputs to generate thresholded, filtered outputs;
 C) determining the position the object based on a center of mass of the thresholded, filtered outputs; and
 D) determining the span of the object based on the thresholded, filtered outputs.

7. The method of claim 1 further comprising steps of:
 a1) detecting sub-images within the image;
 a2) normalizing the detected sub-images; and
 a3) reassembling the normalized detected sub-images.

8. The method of claim 1 further comprising a step of:
 a1) iteratively applying finer resolution sub-images of the image, as an input, until the position of the object can be determined.

9. The method of claim 1 wherein the position of the object determined is a horizontal coordinate of a center of the object.

10. A method for classifying an object contained in an image, the method comprising steps of:
 a) generating windows;
 b) applying the generated windows to the image to form windowed images;
 c) determining a position of the object by providing the windowed images to a trained learning mechanism;
 d) determining a span of the object by providing the windowed images to the trained learning mechanism;
 e) normalizing the object based on the determined span to form a normalized object;
 f) centering the normalized object within a classification window based on the determined position; and
 g) classifying the object based on the classification window to generate a classification result.

11. The method of claim 10 further comprising a step of:
   h) postprocessing the classification result based on at least one of (i) a confidence measure, and (ii) the determined position of the object.

12. The method of claim 10 further comprising steps of:
   a1) detecting sub-images within the image;
   a2) normalizing the detected sub-images;
   a3) reassembling the normalized detected sub-images; and
   h) postprocessing the classification result based on at least one of (i) a confidence measure, (ii) the determined position of the object, and (iii) a sub-image boundary.

13. The method of claim 10 wherein the position of the object determined is a horizontal coordinate of a center of the object.

14. A device for processing an image having an object to be classified, the device comprising:
   a) means for generating windows and for applying the generated windows to the image to form windowed images;
   b) means for determining a position and a span of the object by providing the windowed images to a trained learning mechanism;
   c) means for normalizing the object based on the determined span to form a normalized object; and
   d) means for centering the normalized object within a classification window based on the determined position,
wherein the normalized object centered within the classification window may be classified.

15. The device of claim 14 wherein the trained leaning mechanism is a neural network.

16. The device of claim 15 wherein the neural network includes an input layer of neurons, a Gabor layer of neurons having inputs coupled with outputs of the neurons of the input layer, at least one hidden layer of neurons, and an output layer of neurons.

17. The device of claim 15 wherein the neural network includes:
   i) an input layer of neurons,
   ii) a Gabor layer of neurons having inputs coupled with outputs of the neurons of the input layer,
   iii) a first hidden layer of neurons having inputs coupled with outputs of the neurons of the Gabor layer,
   iv) a second hidden layer of neurons having inputs coupled with outputs of the neurons of the first hidden layer,
   v) a third hidden layer of neurons having inputs coupled with outputs of the neurons of the second hidden layer, and
   vi) an output layer of neurons having inputs coupled with outputs of the neurons of the third hidden layer.

18. The device of claim 14 wherein the means for determining a position and a span of the object by providing the windowed images to a trained learning mechanism includes:
   i) the trained learning mechanism providing outputs based on the windowed images; and
   ii) means for post-processing the outputs of the trained learning mechanism.

19. The device of claim 18 wherein the means for post-processing includes:
   A) means for filtering the outputs of the trained learning mechanism to generate filtered outputs;
   B) means for thresholding the filtered outputs to generate thresholded, filtered outputs;
   C) means for determining the position of the object based on a center of mass of the thresholded, filtered outputs; and
   D) means for determining the span of the object based on the thresholded, filtered outputs.

20. The device of claim 14 further comprising:
   a1) means for detecting sub-images within the image;
   a2) means for normalizing the detected sub-images; and
   a3) means for reassembling the normalized detected sub-images.

21. The device of claim 14 further comprising:
   e) means for classifying the object based on the classification window to generate a classification result.

22. The device of claim 21 further comprising:
   f) means for postprocessing the classification result based on at least one of (i) a confidence measure, and (ii) the determined position of the object.

23. The device of claim 21 further comprising:
   a1) means for detecting sub-images within the image;
   a2) means for normalizing the detected sub-images;
   a3) means for reassembling the normalized detected sub-images; and
   f) means for postprocessing the classification result based on at least one of (i) a confidence measure, (ii) the determined position of the object, and (iii) a sub-image boundary.

24. The device of claim 14 wherein the position of the object is a horizontal coordinate of a center of the object.

* * * * *